United States Patent
Yamada

(10) Patent No.: US 8,644,642 B2
(45) Date of Patent: Feb. 4, 2014

(54) IMAGE QUALITY EVALUATION METHOD, SYSTEM, AND PROGRAM BASED ON AN ALTERNATING-CURRENT COMPONENT DIFFERENTIAL VALUE

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 354 days.

(21) Appl. No.: 12/922,806

(22) PCT Filed: Apr. 28, 2009

(86) PCT No.: PCT/JP2009/058348
§ 371 (c)(1),
(2), (4) Date: Sep. 15, 2010

(87) PCT Pub. No.: WO2009/133884
PCT Pub. Date: Nov. 5, 2009

(65) Prior Publication Data
US 2011/0013844 A1 Jan. 20, 2011

(30) Foreign Application Priority Data
Apr. 30, 2008 (JP) .................. 2008-118348

(51) Int. Cl.
*G06K 9/36* (2006.01)
(52) U.S. Cl.
USPC ........................................................ 382/276
(58) Field of Classification Search
None
See application file for complete search history.

(56) References Cited

U.S. PATENT DOCUMENTS

| 6,239,834 | B1 | 5/2001 | Miyaji et al. | |
|---|---|---|---|---|
| 6,678,424 | B1 | 1/2004 | Ferguson | |
| 2001/0026630 | A1 * | 10/2001 | Honda | 382/107 |
| 2004/0183950 | A1 | 9/2004 | Sugimoto et al. | |
| 2005/0094887 | A1 * | 5/2005 | Cakir et al. | 382/254 |
| 2006/0153472 | A1 * | 7/2006 | Sakata et al. | 382/255 |
| 2008/0253689 | A1 * | 10/2008 | Ferguson | 382/294 |

FOREIGN PATENT DOCUMENTS

| JP | 05-068171 | A | 3/1993 |
|---|---|---|---|
| JP | 07-093543 | A | 4/1995 |
| JP | 09-307930 | A | 11/1997 |
| JP | 2001-197527 | A | 7/2001 |
| JP | 2002-077949 | A | 3/2002 |
| JP | 3458600 | B2 | 10/2003 |
| JP | 2004-260602 | A | 9/2004 |
| JP | 2006-173661 | A | 6/2006 |
| JP | 2007-213166 | A | 8/2007 |

OTHER PUBLICATIONS

Wang et al., "Why is image quality assessment so difficult?" in: Proceedings of the IEEE International Conference on Acoustics, Speech, and Signal Processing, Orlando, May 2002.*
Wang et al., "Video quality assessment based on structural distortion measurement," Signal Process.: Image Commun., vol. 19, 2004.*

(Continued)

*Primary Examiner* — Daniel Mariam
*Assistant Examiner* — Andrew Moyer
(74) *Attorney, Agent, or Firm* — Sughrue Mion, PLLC

(57) ABSTRACT

Disclosed is a picture quality evaluation method that evaluates the quality of a second image based on alternating current component measurements for a pixel set in a first image and alternating current component measurements for a pixel set in a second image in the same location as the pixel set in the first image.

22 Claims, 11 Drawing Sheets

(56) References Cited

OTHER PUBLICATIONS

Wang and Shang, "Spatial pooling strategies for perceptual image quality assessment," in Proceedings of IEEE International Conference on Image Processing, 2006, pp. 2945-2948.*

Aja-Fernandez et al., "Image Quality Assessment based on Local Variance," Proceedings of the 28th IEEE, EMBS Annual International Conference, New York City, Aug. 30-Sep. 3, 2006.*

Eskicioglu and Fisher, "Image Quality Measures and Their Performance," IEEE Transactions on Communications, vol. 43, No. 12, Dec. 1995.*

Nill, "A Visual Model Weighted Cosine Transform for Image Compression and Quality Assessment," IEEE Transactions on Communications, vol. COM-33, No. 6, Jun. 1985.*

Ginesu et al., "A multi-factors approach for image quality assessment based on a human visual system model," Signal Processing: Image Communication 21, 2006, pp. 316-333.*

Wikipedia, "Norm (mathematics)," http://en.wikipedia.org/w/index.php?title=Norm_(mathematics)&oldid=206490501, Apr. 18, 2008.*

Office Action issued by the Japanese Patent Office dated Oct. 2, 2013, in corresponding Application No. 2010-510135.

* cited by examiner

IMAGE QUALITY EVALUATION METHOD, SYSTEM, AND PROGRAM BASED ON AN ALTERNATING-CURRENT COMPONENT DIFFERENTIAL VALUE

TECHNICAL FIELD

The present invention relates to an image quality evaluation method, an image quality evaluation system and a program.

BACKGROUND ART

Methods of objectively evaluating image quality of videos include methods of using the absolute difference, squared difference, and S/N ratio of pixel values (luminance, color difference, RGB value, etc.) between an original image and an image of interest for evaluation. For example, an image quality evaluation method disclosed in Patent Document 1 uses the S/N ratio while taking account of human visual properties varying with the spatial frequency, and determines an objective image quality value by calculating an S/N ratio based on a differential value between a pixel value of data of an image of interest for evaluation and that of its original image, and applying a weight to the S/N ratio based on the power of the alternating-current components for the image data in a whole frame.

Patent Document 1: JP-3458600B2

DISCLOSURE OF THE INVENTION

Problems to be Solved by the Invention

The image quality evaluation method disclosed in Patent Document 1 gives a great difference between a pixel value in the original image and that in the image of interest for evaluation in a case that the pixel value contains a certain gain (by which the pixel value is multiplied) or an offset (which is added to the pixel value) between the original image and image of interest for evaluation, thus leading to a problem that the correlation between subjective image quality and objective image quality is lowered.

A gain or offset is generated by applying processing for enhancing the brightness of a video to an image of interest for evaluation in coding the video or the like. For example, assuming that the luminance of an image of interest for evaluation is larger than that of an original image by five for all pixels (offset: +5), the image quality evaluation based on the difference in pixel value (luminance, color difference, RGB value, or the like) as disclosed in Patent Document 1 gives differences greater by the value of the offset, resulting in estimation indicating that image quality is degraded accordingly.

Thus, the present invention has been made in view of such a problem, and its object is to provide an image quality evaluation method, an image quality evaluation system, and a program with which the correlation between subjective evaluation and objective evaluation is improved even in a case that the pixel value contains a gain or offset between an original image and an image of interest for evaluation.

Means for Solving the Problems

The present invention for solving the aforementioned problem is an image quality evaluation method, characterized in comprising, based on a statistical quantity of alternating-current components within a pixel group in a first image and that within a pixel group in a second image at the same position as that of said pixel group in said first image, evaluating image quality of said second image.

The present invention for solving the aforementioned problem is an image quality evaluation method in which an original image is transmitted via a network, and the original image is received as an image of interest for evaluation, the method being characterized in comprising: calculating an average of absolute differences within an image group in said original image, each of said differences being an absolute difference between an average of pixel values within said pixel group and each pixel value within said pixel group; calculating an average of absolute differences within an image group in an image of interest for evaluation, each of said differences being an absolute difference between an average of pixel values within said pixel group at the same position as that of said pixel group in said original image and each pixel value within said pixel group; transmitting at least the calculated average within said image group in said original image or that within said image group in said image of interest for evaluation to an image evaluation system for evaluating an image of interest for evaluation; and calculating an objective image quality value for the image of interest for evaluation at said image evaluation system based on a differential value between said average within said image group in said first image and said average within said image group in said second image.

The present invention for solving the aforementioned problem is an image quality evaluation system, characterized in comprising: a first image alternating-current component calculating section for calculating a statistical quantity of alternating-current components within a pixel group in a first image; a second image alternating-current component calculating section for calculating a statistical quantity of alternating-current components within a pixel group in a second image; and an image quality evaluating section for evaluating image quality of said second image based on the statistical quantity of alternating-current components within a pixel group in said second image at the same position as that of said pixel group in said first image.

The present invention for solving the aforementioned problem is an image quality evaluation system, characterized in comprising: an original image alternating-current component calculating section for calculating an average of absolute differences within an image group in an original image, each of said differences being an absolute difference between an average of pixel values within said pixel group and each pixel value within said pixel group; an evaluated image alternating-current component calculating section for calculating an average of absolute differences within an image group in an image of interest for evaluation, each of said differences being an absolute difference between an average of pixel values within said pixel group and each pixel value within said pixel group; a differential value calculating section for acquiring at least an average within said image group calculated by said original image alternating-current component calculating section or that calculated by said evaluated image alternating-current component calculating section via a network, and calculating a differential value between the average within said image group in said original image and that within said image group in said image of interest for evaluation at the same position as that of said pixel group in said original image; and an objective image quality value calculating section for calculating an objective image quality value based on said differential value.

The present invention for solving the aforementioned problem is a program characterized in causing an information processing apparatus to execute: first image alternating-current component calculating processing of calculating a statistical quantity of alternating-current components within a pixel group in a first image; second image alternating-current component calculating processing of calculating a statistical quantity of alternating-current components within a pixel group in a second image; and image quality evaluation processing of evaluating image quality of said second image based on the statistical quantity of alternating-current components within a pixel group in said second image at the same position as that of said pixel group in said first image.

EFFECTS OF THE INVENTION

According to the present invention, objective evaluation having a high correlation with subjective evaluation can be provided even in a case that the pixel value contains a gain or offset between an original image (for example, a first image) and an image of interest for evaluation (for example, a second image).

EXPLANATION OF SYMBOLS

101 Original image alternating-current component calculating section
102 Evaluated image alternating-current component calculating section
103 Alternating-current component difference calculating section
104 Objective image quality value calculating section

BEST MODES FOR CARRYING OUT THE INVENTION

Features of an image quality evaluation system in an embodiment will be described hereinbelow.

Figure 1:
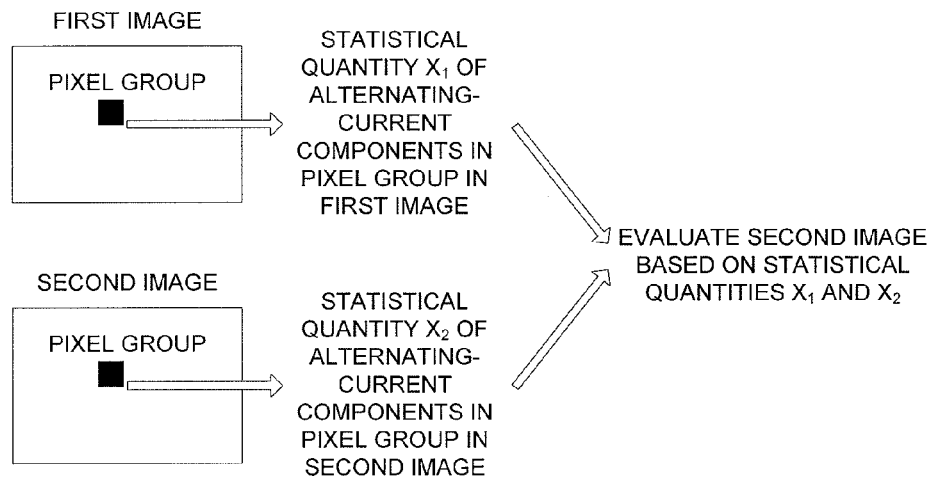
FIG. 1 is a diagram for explaining an image quality evaluation system in an embodiment of the present invention.

An image quality evaluation system in this embodiment is characterized in, based on a statistical quantity $X_1$ of alternating-current components within a pixel group (for example, a block) in a first image, and on a statistical quantity $X_2$ of alternating-current components within a pixel group in a second image at the same position as that of the pixel group in the first image, evaluating the second image, as shown in FIG. 1.

Although the size of a pixel group is not limited here, it is, for example, 8 by 8 pixels, or 16 by 16 pixels. The image group for which a statistical quantity of alternating-current components is calculated may be defined by dividing a whole image into sub-areas having a predetermined size, and a statistical quantity of alternating-current components may be calculated for each image group having the size, or alternatively, calculated only for some image groups in the image.

A statistical quantity of alternating-current components is obtained by, for example, determining an average of pixel values of pixels within a pixel group, and calculating an average of absolute differences between the average and each pixel value within the pixel group. The statistical quantity of alternating-current components may be a variance of pixel values within a pixel group.

In evaluating a second image, an objective image quality value for the second image is calculated based on, for example, a difference between a statistical quantity of alternating-current components within a pixel group in a first image and that within a pixel group in the second image at the same position as that of the pixel group in the first image (which difference will be referred to as an alternating-current component differential value hereinbelow).

The alternating-current component differential value is, for example, an absolute difference or a squared difference between a statistical quantity of alternating-current components within a pixel group in the first image and that within a pixel group in the second image at the same position as that of the pixel group in the first image.

Then, an average of alternating-current component differential values or average S/N ratio per unit image group over a predetermined number of frames, the number being at least one or more, or an average of alternating-current component differential values or average S/N ratio for a whole video is calculated as an objective image quality value for the second image to evaluate the second image. Moreover, an average of alternating-current component differential values or average S/N ratio per unit frame over a predetermined number of frames, the number being at least one or more, or an average of alternating-current component differential values or average S/N ratio for a whole video may be calculated as the objective image quality value for the second image.

Alternatively, other evaluation for the second image may use, in place of the alternating-current component differential value, a ratio between a statistical quantity of alternating-current components within a pixel group in the first image and that within a pixel group in the second image at the same position as that of the pixel group in the first image.

Thus, according to this embodiment, an effect of the gain or offset can be eliminated by using alternating-current components in image quality evaluation after removing a DC (direct-current) component, which is affected by the gain or offset, from a pixel value, rather than directly using a pixel value, such as luminance, color difference, RGB value, or the like, in an image.

It should be noted that this embodiment is not limited to application to an FR (Full Reference)-based evaluation scheme in which image data of a first image can be acquired, and it can be applied to an RR (Reduced Reference)-based evaluation scheme in which a feature of the first image can be acquired. In the RR-based scheme, for example, a statistical quantity of alternating-current components within a pixel group in the first image is acquired as feature.

Now specific embodiments will be described. It should be noted that the following description will be made assuming that the first image is an original image and the second image is an image of interest for evaluation.

<First Embodiment>

An image quality evaluation system in a first embodiment of the present invention will now be described in detail with reference to the accompanying drawings.

Figure 2:
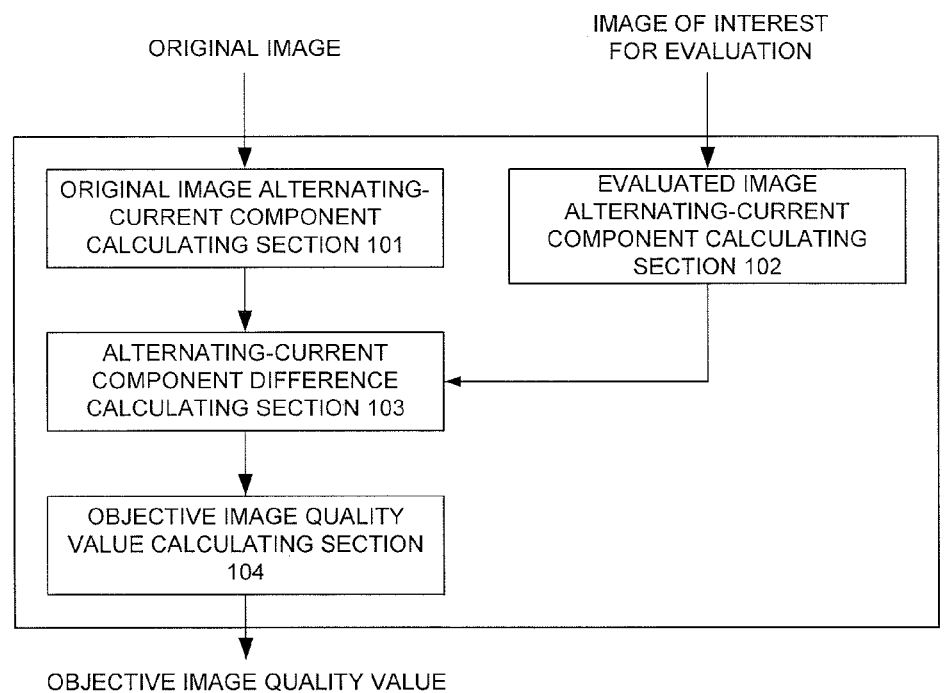
FIG. 2 is a block diagram of an image quality evaluation system in a first embodiment.

Referring to FIG. 2, the image quality evaluation system in the first embodiment is comprised of: an original image alternating-current component calculating section 101 for calculating a statistical quantity of alternating-current components for each predetermined pixel group in an original image; an evaluated image alternating-current component calculating section 102 for calculating a statistical quantity of alternating-current components for each predetermined pixel group in an image of interest for evaluation; an alternating-current component difference calculating section 103 for calculating an alternating-current component differential value, which is a difference between the statistical quantity of alternating-current components in the original image and that in the image of interest for evaluation, for each predetermined pixel group; and an objective image quality value calculating section 104 for determining an objective image quality value from a result of calculation of the alternating-current component differential value.

The original image alternating-current component calculating section 101 accepts pixel data for one frame of an original image as input, and calculates a statistical quantity of alternating-current components for each predetermined pixel group (for example, 16 by 16 pixels). Likewise, the evaluated image alternating-current component calculating section 102 accepts pixel data for one frame of an image of interest for evaluation as input, and calculates a statistical quantity of alternating-current components for each pixel group having the same size as that in the original image alternating-current component calculating section 101.

At that time, the original image alternating-current component calculating sections 101 and evaluated image alternating-current component calculating sections 102 do not need to calculate the statistical quantity of alternating-current components for all pixel groups within one frame. For example, the calculation may be performed on pixel groups at predetermined intervals to reduce the amount of calculation. Moreover, the statistical quantity of alternating-current components may be calculated for all pixel groups near the center of the frame, which the human viewers tend to watch, and calculated for pixel groups at predetermined intervals near the periphery of the frame to thereby achieve both maintenance of precision in image quality evaluation and reduction of the amount of calculation. Furthermore, the statistical quantity of alternating-current components for a pixel group near the periphery of the frame may be omitted from the calculation in order to exclude an effect of inconsistency in pixel value near the periphery between the original image and image of interest for evaluation. For example, analog processing provided within a moving picture processing section for use in generating the image of interest for evaluation may cause improper handling of pixels near the periphery, and result in inconsistency in pixel values near the periphery.

The statistical quantity of alternating-current components calculated by the original image alternating-current component calculating section 101 is obtained by determining an average of pixel values within a pixel group, and calculating an average of absolute differences within the image group, each of the differences being an absolute difference between the average and each pixel value within the pixel group. Alternatively, the statistical quantity of alternating-current components may be calculated as a variance of pixel values within the pixel group.

The alternating-current component difference calculating section 103 calculates an alternating-current component differential value, which is a differential value between the statistical quantity of alternating-current components in the original image and that in the image of interest for evaluation, on a pixel group-by-pixel group basis. The alternating-current component differential value is obtained by, for example, calculating an absolute difference or a squared difference between the statistical quantity of alternating-current components in the original image and that in the image of interest for evaluation.

The objective image quality value calculating section 104 calculates an objective image quality value based on the alternating-current component differential value of the pixel group. The objective image quality value is output as an average of alternating-current component differential values or the like for every predetermined number of frames, the number being at least one or more. For example, it is output as an average per frame, an average over a predetermined frame interval (an average per unit frame over a certain number of frames), or an average in a whole video. It should be noted that the objective image quality value based on an alternating-current component differential value may be a value other than the average. For example, it may be output as an S/N ratio obtained with a denominator of the squared difference (alternating-current component differential value), and calculating a logarithm thereof.

Figure 3:
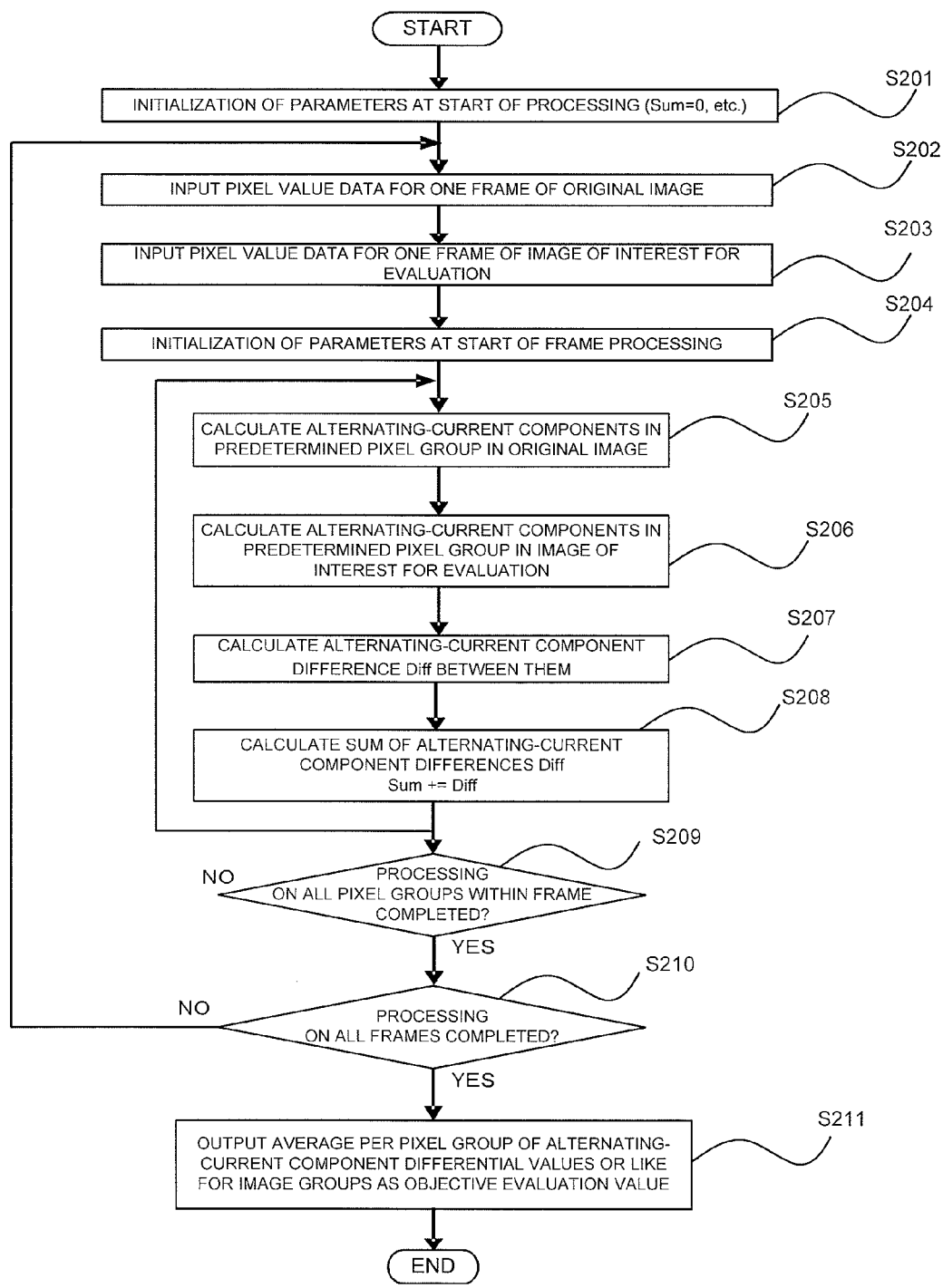
FIG. 3 is a flow chart of an operation of the image quality evaluation system in the first embodiment.

Next, an operation of the image quality evaluation system in the first embodiment will be described. FIG. 3 is a flow chart of an operation of the image quality evaluation system in the first embodiment.

First, initialization is performed on parameters required in image quality evaluation processing (S201). At this step, for example, initialization of a pointer indicating a frame position, and zero reset of parameters for saving the sum of alternating-current component differential values to be calculated are performed.

Pixel value data for one frame of an original image is input to the original image alternating-current component calculating section 101 (S202). Likewise, pixel value data for one frame of an image of interest for evaluation is also input to the evaluated image alternating-current component calculating section 102 (S203).

Initialization of parameters required in performing image quality evaluation processing for one frame is performed (S204). For example, initialization of a parameter indicating the position of the pixel group being processed is performed here.

Next, a statistical quantity of alternating-current components in a pixel group in the original image and that in the image of interest for evaluation at the same position are calculated (S205, S206). The statistical quantity of alternating-current components is obtained by determining an average of pixel values within a pixel group, and calculating an average of absolute differences within the pixel group, each of the differences being an absolute difference between the average and each pixel value within the pixel group, as described above. Alternatively, the statistical quantity of alternating-current components is calculated as a variance of pixel values within the pixel group.

Subsequently, an alternating-current component differential value between the statistical quantity of alternating-current components in the original image and that in the image of interest for evaluation is calculated (S207). The alternating-current component differential value is calculated as an absolute difference or a squared difference.

Next, a sum of alternating-current component differential values up to the time of the processing on the current pixel group is calculated (S208). Then, a check is made as to whether the differential calculation is completed for all pixel groups within one frame (S209). In a case that the calculation is not completed, a pointer to the pixel group is advanced to a next pixel group, and the process goes back to S205 to continue the processing.

On the other hand, in a case that the calculation is completed, a check is made as to whether the processing is completed for all frames in the video at S210. In a case that the processing is not completed, a pointer to the frame is advanced to a next frame, and the process goes back to S202 to continue similar processing on a subsequent frame.

In a case that the processing is completed for all frames, an average or the like of alternating-current component differential values per pixel group is calculated for the image groups (the whole video) at the objective image quality value calculating section 104, the resulting value is output as an objective image quality value (S211), and the processing is terminated.

Figure 4:
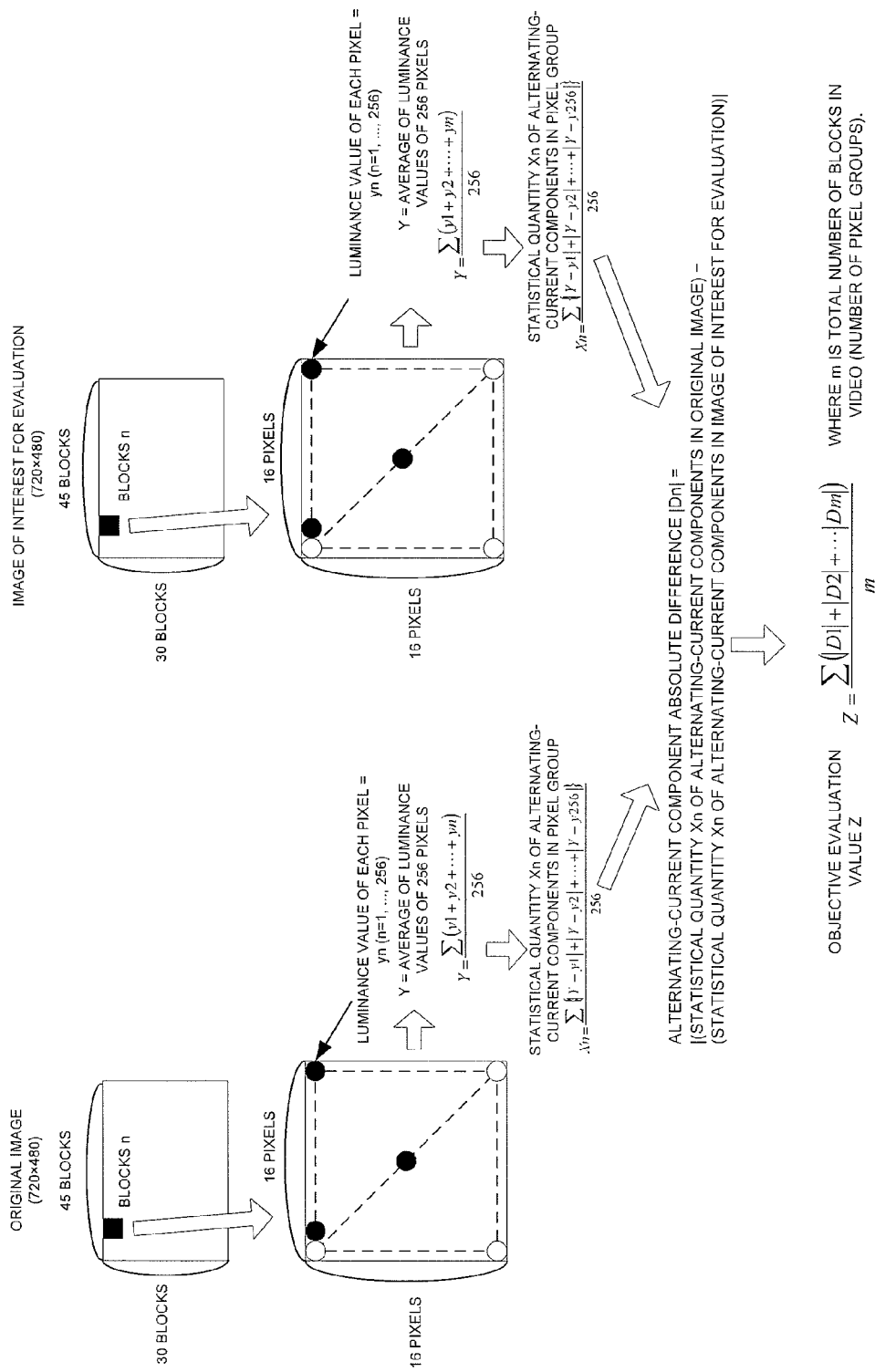
FIG. 4 is a diagram for explaining a specific example in the first embodiment.

Subsequently, a specific example in the first embodiment will be described hereinbelow with reference to FIG. 4.

An original image of an SDTV size (720 pixels in a horizontal direction, 480 pixels in a vertical direction, and 29.97 frames per second), and an image of interest for evaluation obtained by encoding the original image in an MPEG-2 format at 4 Mbps and decoding the encoded image are input to the image quality evaluation system illustrated in FIG. 1.

Each of frames of the images at the same time is divided such that one frame is divided into pixel groups each having 16 pixels in a horizontal direction by 16 pixels in a vertical direction (45 by 30 blocks), and calculates a statistical quantity of alternating-current components in each pixel group. The statistical quantity of alternating-current components for the original image is calculated by the original image alternating-current component calculating section 101, and that for the image of interest for evaluation is calculated by the evaluated image alternating-current component calculating section 102.

A statistical quantity $X_n$ of the alternating-current components for block 'n' is calculated by determining an average Y of luminance values for 16×16=256 pixels, and calculating an average of absolute differences, each of the differences being an absolute difference between the average Y of the luminance values and an luminance value for each of 256 pixels.

Next, the alternating-current component difference calculating section 103 calculates an absolute difference $D_n$ (which will be referred to as an alternating-current component absolute difference hereinbelow) as an alternating-current component differential value of the statistical quantity of alternating-current components between pixel groups in the same frame and at the same position for the original image and image of interest for evaluation. For example, in a case that the alternating-current component for the original image is ten and that for the image of interest for evaluation is eight, the alternating-current component absolute difference $D_n$ is two.

The processing is repeated for all pixel groups lying in the frame to calculate a total sum of the alternating-current component absolute differences $D_n$ in a whole video, which is a set of all images, by adding the alternating-current component absolute differences $D_n$ to a parameter for calculating the sum of the alternating-current component absolute differences $D_n$.

The objective image quality value calculating section 104 calculates an average of the alternating-current component absolute differences per pixel group from the calculated sum of alternating-current component absolute differences and the number of the processed pixel groups, which average is output as an objective image quality value Z.

As described above, the first embodiment provides a result of objective image quality evaluation having a high correlation with a result of subjective evaluation. The reason of this is that image quality evaluation is conducted based on the statistical quantity of alternating-current components for each predetermined pixel group, rather than based on a difference between pixel values, whereby the objective image quality value can be calculated with high precision even in a case that the pixel value contains a certain gain or offset, which affects the DC component, between the original image and image of interest for evaluation.

<Second Embodiment>

Now a second embodiment of the present invention will be described in detail.

Figure 5:
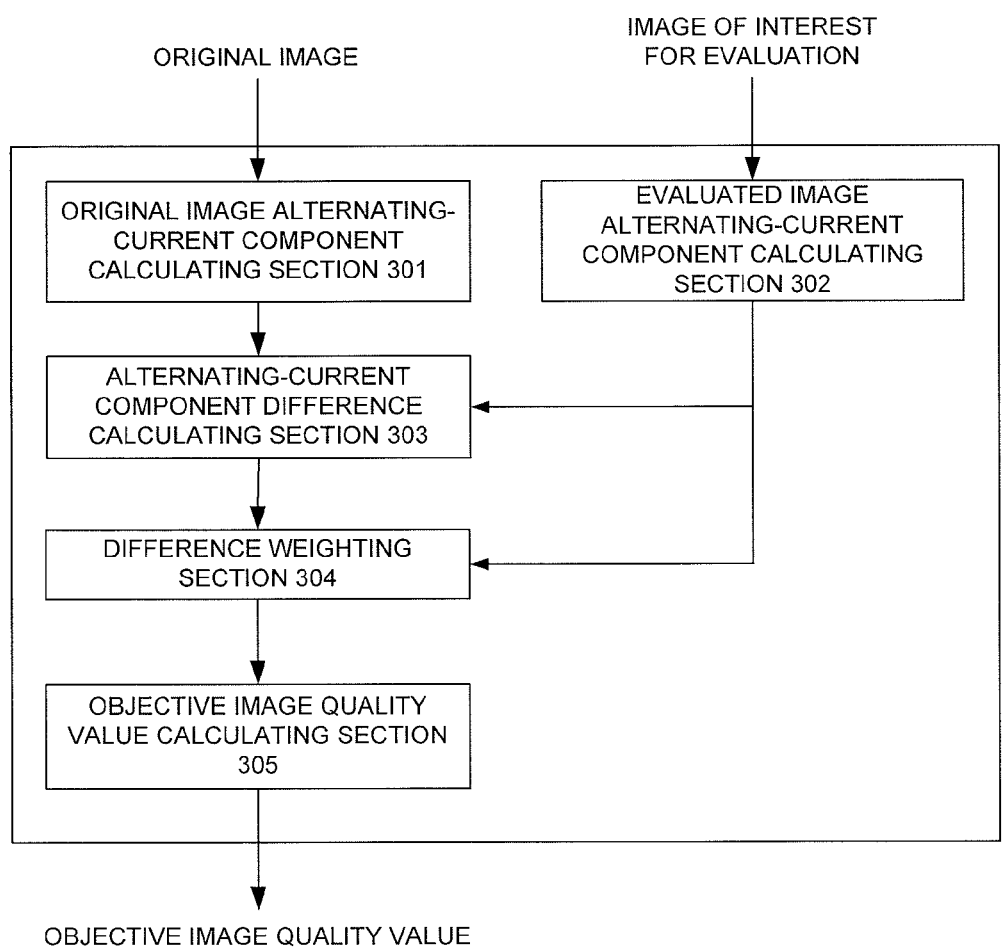
FIG. 5 is a block diagram of an image quality evaluation system in a second embodiment.

Referring to FIG. 5, the image quality evaluation system in the second embodiment is comprised of: an original image alternating-current component calculating section 301 for calculating a statistical quantity of alternating-current components for each predetermined pixel group in an original image; an evaluated image alternating-current component calculating section 302 for calculating a statistical quantity of alternating-current components for each predetermined pixel group in an image of interest for evaluation; an alternating-current component difference calculating section 303 for calculating an alternating-current component differential value between the statistical quantity of alternating-current components in the original image and that in the image of interest for evaluation for each predetermined pixel group; a difference weighting section 304 for applying weighting processing to the alternating-current component differential value based on the magnitude of the statistical quantity of alternating-current components for the image of interest for evaluation; and an objective image quality value calculating section 305 for determining an objective image quality value from a result of calculation of the differential value.

In the second embodiment, the alternating-current component differential value is weighted based on the magnitude of the calculated statistical quantity of alternating-current components for the image of interest for evaluation.

Referring to FIG. 5, in the image quality evaluating section in the second embodiment, pixel data for one frame of an original image is first input to the original image alternating-current component calculating section 301, and a statistical quantity of alternating-current components is calculated for each predetermined pixel group (for example, 16 by 16 pixels). Likewise, pixel data for one frame of an image of interest for evaluation is input to the evaluated image alternating-current component calculating section 302, and a statistical quantity of alternating-current components is calculated for the same size as that of the pixel group.

Next, the alternating-current component difference calculating section 303 calculates an alternating-current component differential value for the statistical quantity of alternating-current components on a pixel group-by-pixel group basis.

The difference weighting section 304 compares the statistical quantity of alternating-current components for the image of interest for evaluation with predetermined thresholds Th1, Th2, where Th1>Th2. For example, the processing is performed with Th1 of 20 and Th2 of 1. A statistical quantity of alternating-current components for the image of interest for evaluation greater than the threshold Th1 indicates that the current pixel group contain a greater amount of signals of high frequency. Since it is known that the human visual property is insensitive to signals of higher frequency, image quality degradation is not easily detectable in such an area of the pixel group, and accordingly, the alternating-current component differential value is multiplied by a predetermined constant smaller than one to decrease the alternating-current component differential value. On the other hand, a statistical quantity of alternating-current components for the image of interest for evaluation smaller than the threshold Th2 indicates that the current pixel group contain a greater amount of signals of low frequency. Since it is known that the human visual property is more sensitive to signals of lower frequency, image quality degradation is easily detectable in such an area of the pixel group, and accordingly, the alternating-current component differential value is multiplied by a predetermined constant greater than one to increase the alternating-current component differential value.

It should be noted that the number of kinds of the thresholds employed is not limited to two, and it is possible to achieve fine control of weighting by using more thresholds. Moreover, the weighting processing at the difference weighting section 304 does not need to rely upon the comparison with a threshold as described herein, and it may be achieved by, for example, using a weight directly calculated from the calculated statistical quantity of alternating-current components. Moreover, while the weighting processing is applied to the alternating-current component differential value for an image group to which the weighting processing is to be applied in this embodiment, it may be applied to a statistical quantity of alternating-current components for the image of interest for evaluation for an image group to which the weighting processing is to be applied.

Next, the objective image quality value calculating section 305 calculates an objective image quality value based on the alternating-current component differential value for each pixel group to which the weighting processing was applied. The objective image quality value is output as an average of alternating-current component differential values for every predetermined number of frames, the number being at least one or more. For example, it is output as an average per frame, an average over a predetermined frame interval (an average per unit frame over a certain number of frames), or an average in a whole video. It should be noted that the objective image quality value based on an alternating-current component differential value may be a value other than the average. For example, it may be output as an S/N ratio obtained with a denominator of the alternating-current component squared difference, and calculating a logarithm thereof.

As described above, the second embodiment provides a result of objective image quality evaluation having a high correlation with a result of subjective evaluation. The reason of this is that image quality evaluation is conducted based on the statistical quantity of alternating-current component differences for each predetermined pixel group while incorporating weighting processing based on the magnitude of the statistical quantity of alternating-current components for the image of interest for evaluation, whereby correction may be applied to the image quality evaluation value depending upon the human visual property with respect to the spatial frequency.

<Third Embodiment>

Now a third embodiment of the present invention will be described in detail.

Figure 6:
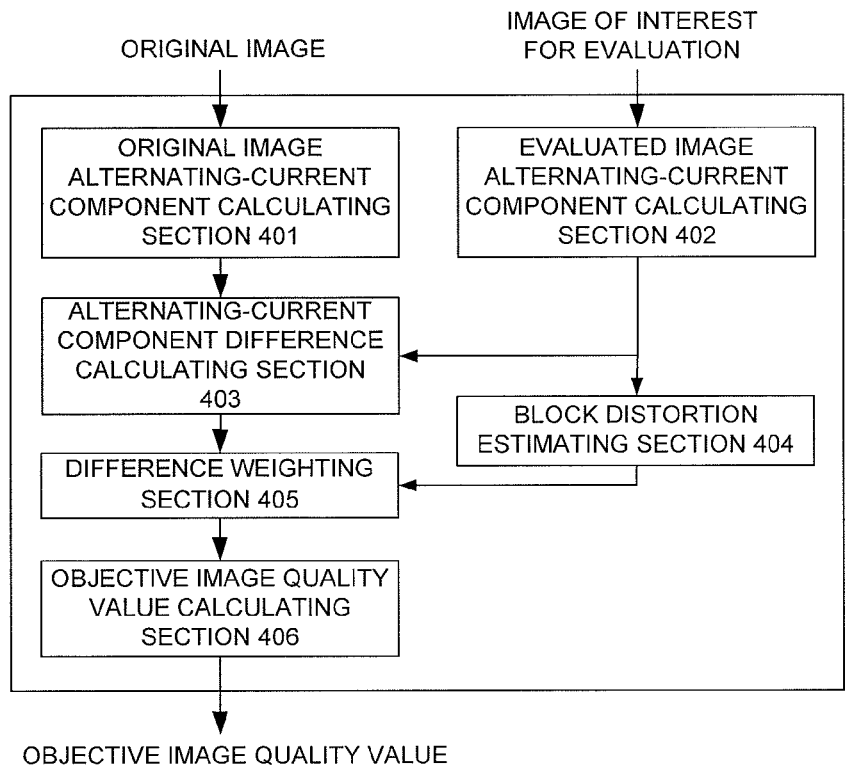
FIG. 6 is a block diagram of an image quality evaluation system in a third embodiment.

Referring to FIG. 6, the image quality evaluation system in the third embodiment is comprised of: an original image alternating-current component calculating section 401 for calculating a statistical quantity of alternating-current components for each predetermined pixel group in an original image; an evaluated image alternating-current component calculating section 402 for calculating a statistical quantity of alternating-current components for each predetermined pixel group in an image of interest for evaluation; an alternating-current component difference calculating section 403 for calculating an alternating-current component differential value, which is a difference in statistical quantity of alternating-current components between the original image and image of interest for evaluation, for each predetermined pixel group; a block distortion estimating section 404 for estimating an amount of block distortion based on the magnitude of the statistical quantity of alternating-current components for the image of interest for evaluation and on the magnitude of the absolute difference between pixel values across a pixel group border; a difference weighting section 405 for applying weighting processing to the alternating-current component differential value based on the amount of block distortion; and an objective image quality calculating section 406 for determining an objective image quality value from a result of calculation of the weighted alternating-current component differential value.

The third embodiment applies a weight to an alternating-current component differential value based on the calculated amount of block distortion. Since block distortion is a factor of image quality degradation that can be easily detected, the weighting processing is applied to a video estimated to have a larger amount of block distortion so that the amount of degradation is increased, to thereby raise the correlation between the calculated objective image quality value and the subjective image quality.

Referring to FIG. 6, in the image quality evaluation system in the third embodiment, pixel data for one frame of an original image is first input to the original image alternating-current component calculating section 401, which calculates a statistical quantity of alternating-current components for each predetermined pixel group (for example, 16 by 16 pixels). Likewise, pixel data for one frame of an image of interest for evaluation is input to the evaluated image alternating-current component calculating section 402, which calculates a statistical quantity of alternating-current components for the same size as that of the pixel group. The alternating-current component difference calculating section 403 then calculates an alternating-current component differential value on a pixel group-by-pixel group basis.

Figure 7:
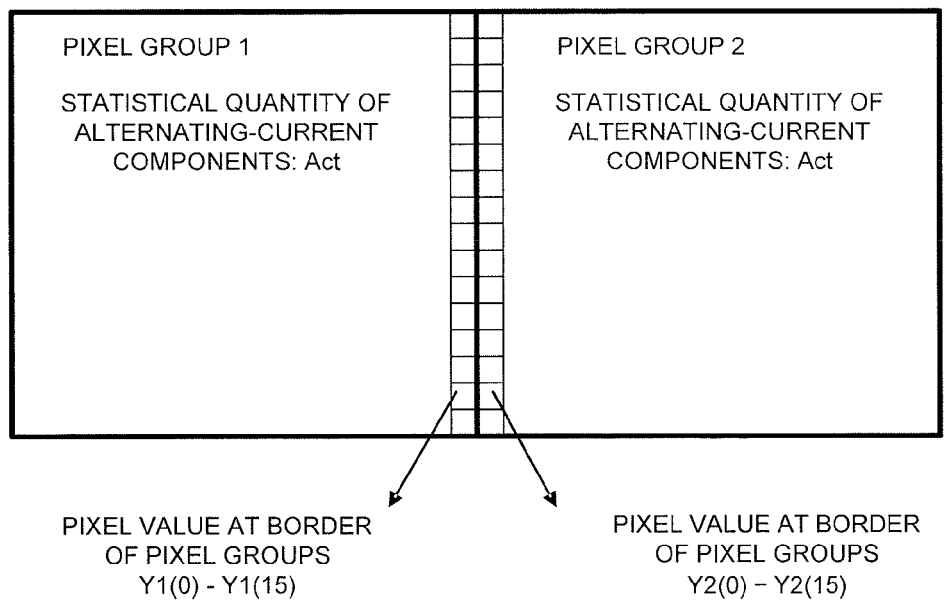
FIG. 7 is a diagram for explaining the third embodiment.

Next, the block distortion estimating section 404 estimates an amount of block distortion occurring in the image of interest for evaluation. The amount of block distortion is determined by comparison of an average of the statistical quantities of alternating-current components for two adjacent pixel groups with an average of absolute differences in pixel value of pixels at which the two pixel groups are contiguous to each other, as shown in FIG. 7.

Representing the statistical quantities of alternating-current components for two adjacent pixel groups as Act1, Act2, and the pixel values of pixels at which the two pixel groups are contiguous to each other as $Y1(i), Y2(i)$ ($i=0 - N-1$, where N is the number of pixels on one side of the pixel group), Diff/Ave is determined, which is a ratio between the average of the statistical quantities of alternating-current components for the two pixel groups represented as Ave=(Act1+Act2)/2, and the average of absolute differences in pixel values of pixels at which the two pixel groups are contiguous to each other represented as Diff=$\{\Sigma abs(Y1(i)-Y2(i))\}/N$.

The difference weighting section 405 applies weighting processing to the alternating-current component differential value based on a result from the block distortion estimating section 404. In particular, in a case that the value of Diff/Ave calculated at the block distortion estimating section 404 is greater than a predetermined threshold, it is decided that block distortion is significant and weighting processing is applied to the alternating-current component differential value. The threshold is one, for example.

The weighting processing multiplies the alternating-current component differential value by a predetermined constant greater than one to expand the difference. At that time, the weighting processing may be applied to each pixel group corresponding to the calculated Diff/Ave, or applied by calculating an average of the values of Diff/Ave per pixel group, comparing the value with a predetermined threshold, and applying the weighting processing to the alternating-current component differential value determined on a frame-by-frame basis or for a whole video.

Moreover, in the evaluated image alternating-current component calculating section 402, the size of a pixel group for a statistical quantity of alternating-current components for calculating an alternating-current component differential value at the alternating-current component difference calculating section 403 may be different from the size of a pixel group for a statistical quantity of alternating-current components for calculating an amount of block distortion at the block distortion estimating section 404. For example, the pixel group may be defined to have 16×16 pixels in calculating an alternating-current component differential value, and have 8×8 pixels in calculating an amount of block distortion. By thus applying the processing, the amount of block distortion can be more accurately estimated even when the size of a pixel group for calculating an alternating-current component differential value is different from the size of a pixel group in which block distortion occurs. At that time, the evaluated image alternating-current component calculating section 402 calculates statistical quantities of alternating-current components for two kinds of sizes of pixel groups.

Next, at the objective image quality value calculating section 406, an objective image quality value is calculated based on the alternating-current component differential value for each pixel group. The objective image quality value is output as an average of alternating-current component differential values for every predetermined number of frames, the number being at least one or more. For example, it is output as an average per frame, an average over a predetermined frame interval (an average per unit frame over a certain number of frames), or an average in a whole video. It should be noted that the objective image quality value based on an alternating-current component differential value may be a value other than the average. For example, it may be output as an S/N ratio obtained with a denominator of the alternating-current component squared difference, and calculating a logarithm thereof.

As described above, the third embodiment provides a result of objective image quality evaluation having a high correlation with a result of subjective evaluation. The reason of this is that the image quality evaluation value is corrected based on the amount of block distortion, which is easily detected as degradation when human viewers watch a video. Particularly, this is because correction can be made so that the image quality evaluation value is lowered for a video that contains a larger amount of block distortion to cause viewers to experience difficulties in watching.

<Fourth Embodiment>

A fourth embodiment of the present invention will be described in detail.

Figure 8:
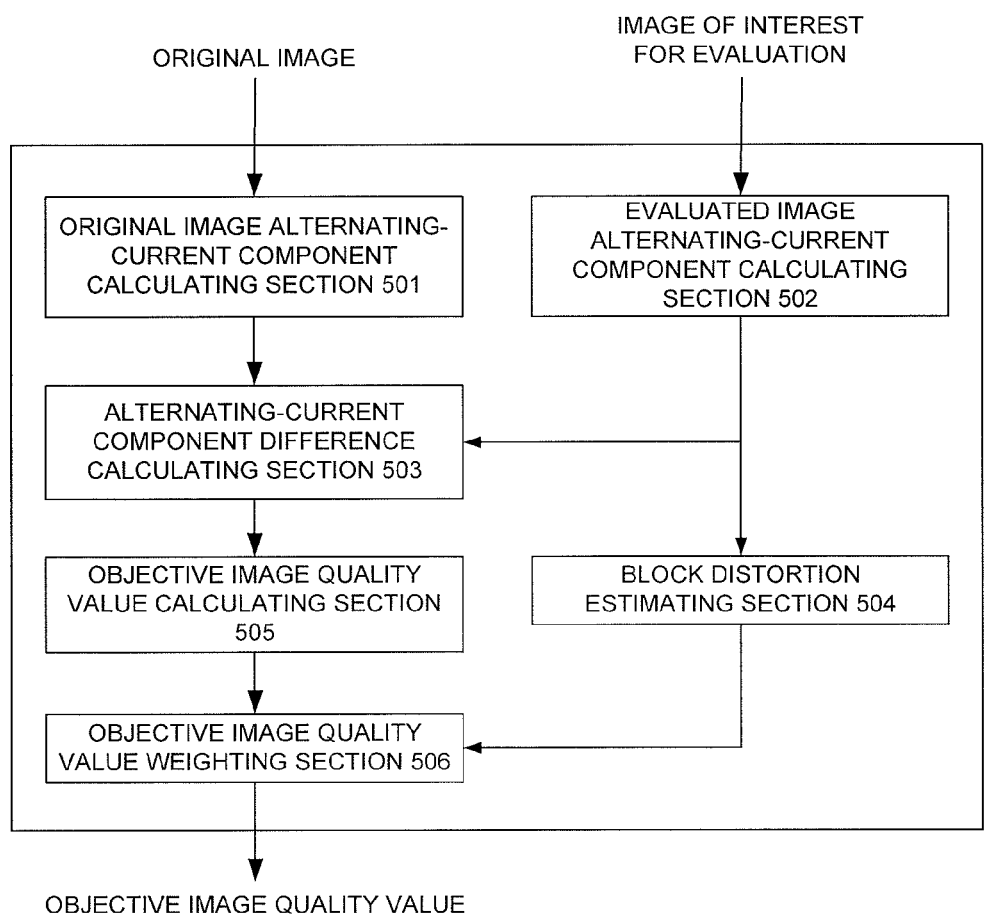
FIG. 8 is a block diagram of an image quality evaluation system in a fourth embodiment.

Referring to FIG. 8, the image quality evaluation system in the fourth embodiment is comprised of: an original image alternating-current component calculating section 501 for calculating a statistical quantity of alternating-current components for each predetermined pixel group in an original image; an evaluated image alternating-current component calculating section 502 for calculating a statistical quantity of alternating-current components for each predetermined pixel group in an image of interest for evaluation; an alternating-current component difference calculating section 503 for calculating an alternating-current component differential value, which is a difference in statistical quantity of alternating-current components between the original image and image of interest for evaluation, for each predetermined pixel group; a block distortion estimating section 504 for estimating an amount of block distortion based on the magnitude of the statistical quantity of alternating-current components for the image of interest for evaluation and on the magnitude of the absolute difference between pixel values across a pixel group border; an objective image quality calculating section 505 for determining a provisional objective image quality value from a result of calculation of the alternating-current component differential value; and an objective image quality value weighting section 506 for applying weighting processing to the objective image quality value based on the amount of block distortion calculated at the block distortion estimating section 504.

The fourth embodiment applies a weight to the objective image quality value based on the calculated amount of block distortion. Since block distortion is a factor of image quality degradation that can be easily detected, the weighting processing is applied to a video estimated to have a larger amount of block distortion so that the amount of degradation is increased, to thereby raise the correlation between the calculated objective image quality value and the subjective image quality.

Referring to FIG. 8, in the image quality evaluation system in the fourth embodiment, pixel data for one frame of an original image is first input to the original image alternating-current component calculating section 501, which calculates a statistical quantity of alternating-current components for each predetermined pixel group (for example, 16 by 16 pixels). Likewise, pixel data for one frame of an image of interest for evaluation is input to the evaluated image alternating-current component calculating section 502, which calculates a statistical quantity of alternating-current components for the same size as that of the aforementioned pixel group. The alternating-current component difference calculating section 503 then calculates an alternating-current component differential value on a pixel group-by-pixel group basis.

Next, the objective image quality calculating section 505 calculates a provisional objective image quality value based on the alternating-current component differential value for each pixel group. The objective image quality value is output as an average of alternating-current component differential values or the like for every predetermined number of frames, the number being at least one or more. For example, it is output as an average per frame, an average over a predetermined frame interval (an average per unit frame over a certain number of frames), or an average in a whole video. It should be noted that the objective image quality value based on an alternating-current component differential value may be a value other than the average. For example, it may be output as an S/N ratio obtained with a denominator of the alternating-current component squared difference, and calculating a logarithm thereof.

The block distortion estimating section 504 estimates an amount of block distortion occurring in the image of interest for evaluation. As with the third embodiment described above, the amount of block distortion is determined by comparison of an average of the statistical quantities of alternating-current components for two adjacent pixel groups with an average of absolute differences in pixel value of pixels at which the two pixel groups are contiguous to each other, as shown in FIG. 7.

Representing the statistical quantities of alternating-current components for two adjacent pixel groups as Act1, Act2, and the pixel values of pixels at which the two pixel groups are contiguous to each other as $Y1(i), Y2(i)$ ($i=0-N-1$, where N is the number of pixels on one side of the pixel group), Diff/Ave is determined, which is a ratio between the average of the statistical quantities of alternating-current components for the two pixel groups represented as Ave=(Act1+Act2)/2, and the average of absolute differences in pixel values of pixels at which the two pixel groups are contiguous to each other represented as Diff=$\{\Sigma abs(Y1(i)-Y2(i))\}/N$. In the fourth embodiment, an average of Diff/Ave over the whole image is additionally determined.

The objective image quality value weighting section 506 applies weighting processing to the objective image quality value based on a result from the block distortion estimating section 504. In particular, in a case that the average of Diff/Ave over the whole image is greater than a predetermined threshold, it is decided that block distortion is significant and weighting processing is applied to the objective image quality value. The threshold is one, for example.

In a case that block distortion is decided to be significant (the average of Diff/Ave over the whole image is greater than a predetermined threshold), the weighting processing applies correction so that the objective image quality value becomes smaller than that calculated at the objective image quality value calculating section 505.

As described above, the fourth embodiment provides a result of objective image quality evaluation having a high correlation with a result of subjective evaluation. The reason of this is that the image quality evaluation value is corrected based on the amount of block distortion, which is easily detected as degradation when human viewers watch a video. Particularly, this is because correction can be made so that the image quality evaluation value is lowered for a video that contains a larger amount of block distortion to cause viewers to experience difficulties in watching.

<Fifth Embodiment>

Next, a fifth embodiment of the present invention will be described in detail.

Figure 9:
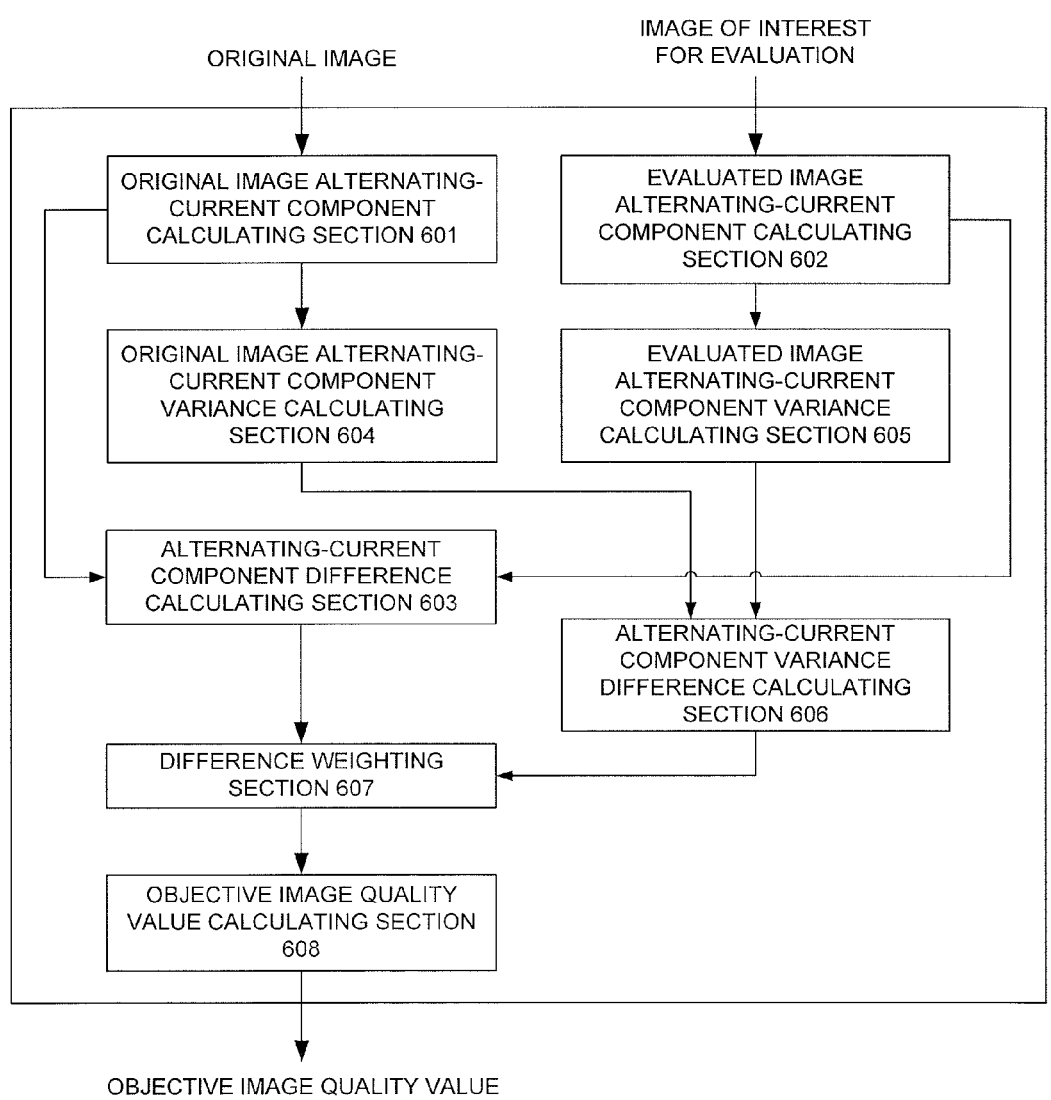
FIG. 9 is a block diagram of an image quality evaluation system in a fifth embodiment.

Referring to FIG. 9, the image quality evaluation system in the fifth embodiment is comprised of: an original image alternating-current component calculating section 601 for calculating a statistical quantity of alternating-current components for each predetermined pixel group in an original image; an evaluated image alternating-current component calculating section 602 for calculating a statistical quantity of alternating-current components for each predetermined pixel group in an image of interest for evaluation; an alternating-current component difference calculating section 603 for calculating an alternating-current component differential value, which is a difference in statistical quantity of alternating-current components between the original image and image of interest for evaluation, for each predetermined pixel group; an original image alternating-current component variance calculating section 604 for determining a variance of alternating-current components in a plurality of vicinal pixel groups in the original image for each pixel group; an evaluated image alternating-current component variance calculating section 605 for determining a variance of alternating-current components in a plurality of vicinal pixel groups in the image of interest for evaluation for each pixel group; an alternating-current component variance difference calculating section 606 for calculating a difference in variance of alternating-current components between the original image and image of interest for evaluation; a difference weighting section 607 for applying weighting processing to the alternating-current component differential value based on the difference in variance of alternating-current components; and an objective image quality calculating section 608 for determining an objective image quality value from a result of calculation of the alternating-current component differential value.

Figure 10:
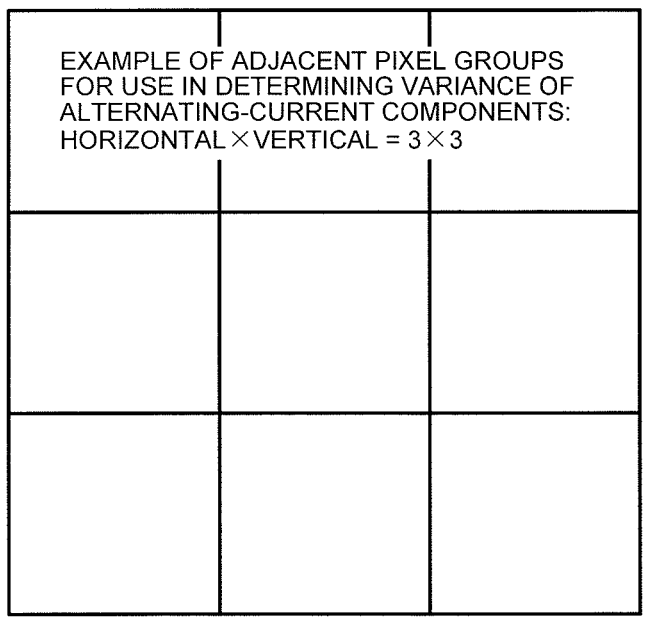
FIG. 10 is a diagram for explaining the fifth embodiment.

In the fifth embodiment, a variance of alternating-current components in a plurality of vicinal pixel groups is determined for each predetermined pixel group, and the presence of local image quality degradation is estimated based on the magnitude of the difference in variance. For example, as shown in FIG. 10, a variance of alternating-current components in 3×3=9 pixel groups is determined both in the original image and image of interest for evaluation, and the presence of the local image quality degradation caused by transmission errors or the like is estimated from the magnitude of the difference in variance. By applying weighting processing so that the amount of degradation is larger for a video estimated to have higher local degradation, the correlation between the calculated objective image quality value and subjective image quality is increased.

Referring to FIG. 9, in the image quality evaluation system in the fifth embodiment, pixel data for one frame of an original image is input to the original image alternating-current component calculating section 601, which calculates a statistical quantity of alternating-current components for each predetermined pixel group (for example, 16 by 16 pixels). Likewise, pixel data for one frame of an image of interest for evaluation is input to the evaluated image alternating-current component calculating section 602, which calculates a statistical quantity of alternating-current components for the same size as that of the aforementioned pixel group. The alternating-current component difference calculating section 603 then calculates an alternating-current component differential value, which is a differential value of alternating-current components, on a pixel group-by-pixel group basis.

Next, the original image alternating-current component variance calculating section 604 determines a variance of alternating-current components in the original image for each set of a plurality of adjacent pixel groups. For example, a variance of alternating-current components is determined for each set of the aforementioned 3×3=9 pixel groups. The number of pixel groups for use in determining a variance may be a number other than nine. Likewise, the evaluated image alternating-current component variance calculating section 605 also calculates a variance for the image of interest for evaluation.

The alternating-current component variance difference calculating section 606 calculates a differential value in calculated variance of alternating-current components between the original image and image of interest for evaluation. The differential value is calculated as an absolute difference or a squared difference.

In a case that the differential value in variance of alternating-current components is greater than a predetermined threshold, the difference weighting section 607 decides that local degradation occurs, and applies weighting processing to the alternating-current component differential value. The alternating-current component differential value is multiplied by a predetermined constant greater than one to increase the alternating-current component differential value. At that time, the weighting processing may be applied on a pixel group-by-pixel group basis or on a frame-by-frame basis, or may be applied by determining an average of the variances of alternating-current components per pixel group in the whole video, comparing the value with a predetermined threshold, and applying the weighting processing to the alternating-current component differential value determined on a frame-by-frame basis or for the whole video.

Alternatively, the difference weighting section 607 may apply the weighting processing by determining an average of the differential values in variance of alternating-current components on a frame-by-frame basis, comparing a ratio between a maximum and a minimum of the averages with a predetermined threshold, and in a case that the ratio is greater than the predetermined threshold, deciding that local degradation occurs in the video. For example, the threshold employed may be six. The alternating-current component differential value is multiplied by a predetermined constant greater than one to expand the difference. At that time, the weighting processing may be applied on a pixel group-by-pixel group basis, or may be applied by determining an average of the variances of alternating-current components per pixel group on a frame-by-frame basis or for the whole video, comparing the value with a predetermined threshold, and applying the weighting processing to an alternating-current component differential value obtained on a frame-by-frame basis or for the whole video.

Next, the objective image quality calculating section 608 calculates an objective image quality value based on the alternating-current component differential value for each pixel group. The objective image quality value is output as an average of alternating-current component differential values or the like for every predetermined number of frames, the number being at least one or more. For example, it is output as an average per frame, an average over a predetermined frame interval (an average per unit frame over a certain number of frames), or an average in a whole video. It should be noted that the objective image quality value based on an alternating-current component differential value may be a value other than the average. For example, it may be output as an S/N ratio obtained with a denominator of the alternating-current component squared difference, and calculating a logarithm thereof.

As described above, the fifth embodiment provides a result of objective image quality evaluation having a high correlation with a result of subjective evaluation. The reason of this is that the image quality evaluation value is corrected based on the amount of degradation caused by transmission errors, which is easily detected as degradation when human viewers watch a video.

<Sixth Embodiment>

Next, a sixth embodiment of the present invention will be described in detail.

Figure 11:
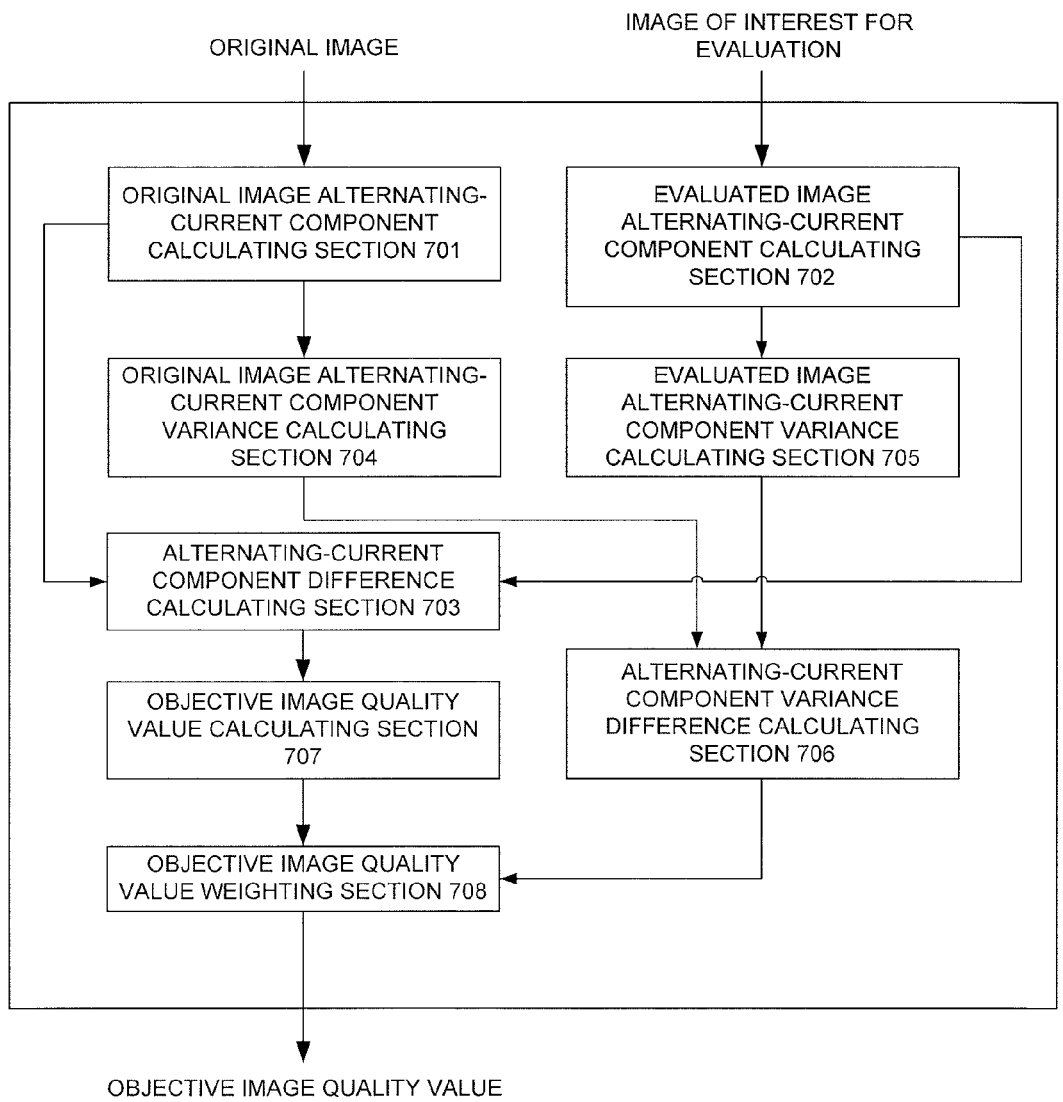
FIG. 11 is a block diagram of an image quality evaluation system in a sixth embodiment.

Referring to FIG. 11, the image quality evaluation system in the sixth embodiment is comprised of: an original image alternating-current component calculating section 701 for calculating a statistical quantity of alternating-current components for each predetermined pixel group in an original image; an evaluated image alternating-current component calculating section 702 for calculating a statistical quantity of alternating-current components for each predetermined pixel group in an image of interest for evaluation; an alternating-current component difference calculating section 703 for calculating an alternating-current component differential value, which is a difference in statistical quantity of alternating-current components between the original image and image of interest for evaluation, for each predetermined pixel group; an original image alternating-current component variance calculating section 704 for determining a variance of alternating-current components in a plurality of vicinal pixel groups in the original image for each pixel group as described above; an evaluated image alternating-current component variance calculating section 705 for determining a variance of alternating-current components in a plurality of vicinal pixel groups in the image of interest for evaluation for each pixel group; an alternating-current component variance difference calculating section 706 for calculating a difference in variance of alternating-current components between the original image and image of interest for evaluation; an objective image quality value calculating section 707 for determining a provisional objective image quality value from a result of calculation of the alternating-current component differential value; and an objective image quality value weighting section 708 for applying weighting processing to the objective image quality value based on the difference in variance of alternating-current components.

In the sixth embodiment, similarly to the fifth embodiment described above, a variance of alternating-current components in a plurality of vicinal pixel groups is determined for each predetermined pixel group, and the presence of local image quality degradation is estimated based on the magnitude of the difference in variance. For example, as shown in FIG. 10, a variance of alternating-current components in 3×3=9 pixel groups is determined both in the original image and image of interest for evaluation, and the presence of the local image quality degradation caused by transmission errors or the like is estimated from the magnitude of the difference in variance. By applying weighting processing so that the amount of degradation is larger for a video estimated to have higher local degradation, the correlation between the calculated objective image quality value and subjective image quality is increased.

Referring to FIG. 11, in the image quality evaluation system in the sixth embodiment, pixel data for one frame of the original image is input to the original image alternating-current component calculating section 701, which calculates a statistical quantity of alternating-current components for each predetermined pixel group (for example, 16 by 16 pixels). Likewise, pixel data for one frame of the image of interest for evaluation is input to the evaluated image alternating-current component calculating section 702, which calculates a statistical quantity of alternating-current components for the same size as that of the aforementioned pixel group. The alternating-current component difference calculating section 703 then calculates an alternating-current component differential value, which is a differential value of alternating-current components, on a pixel group-by-pixel group basis.

Next, the original image alternating-current component variance calculating section 704 determines a variance of alternating-current components in the original image for each set of a plurality of adjacent pixel groups. For example, a variance of alternating-current components is determined for each set of the aforementioned 3×3=9 pixel groups. The number of pixel groups for use in determining a variance may be a number other than nine. Likewise, the evaluated image alternating-current component variance calculating section 705 also calculates a variance for the image of interest for evaluation.

The alternating-current component variance difference calculating section 706 calculates a differential value in calculated variance of alternating-current components between the original image and image of interest for evaluation. The differential value is calculated as an absolute difference or a squared difference. In the sixth embodiment, an average of differential values between the variances of alternating-current components (which will be referred to as a variance difference average) is additionally determined on a frame-by-frame basis.

The objective image quality value calculating section 707 calculates a provisional objective image quality value based on the alternating-current component differential value for each pixel group. The objective image quality value is output as an average of alternating-current component differential values or the like for every predetermined number of frames, the number being at least one or more. For example, it is output as an average per frame, an average over a predetermined frame interval (an average per unit frame over a certain number of frames), or an average in a whole video. It should be noted that the provisional objective image quality value based on an alternating-current component differential value may be a value other than the average. For example, it may be output as an S/N ratio obtained with a denominator of the alternating-current component squared difference described above, and calculating a logarithm thereof.

The objective image quality value weighting section 708 compares a ratio between a maximum and a minimum of the difference averages from the alternating-current component variance difference calculating section 706 with a predetermined threshold, and in a case that the ratio is greater than the predetermined threshold, decides that local degradation occurs in the video, and applies correction to the objective value calculated at the objective image quality calculating section 608 so that the objective image quality value is decreased.

As described above, this embodiment provides a result of objective image quality evaluation having a high correlation with a result of subjective evaluation. The reason of this is that the image quality evaluation value is corrected based on the amount of degradation caused by transmission errors, which is easily detected as degradation when human viewers watch a video.

<Seventh Embodiment>

Next, a seventh embodiment of the present invention will be described in detail with reference to FIG. 12.

In the seventh embodiment, the image evaluation system described regarding the first embodiment is implemented by a computer system.

Figure 12:
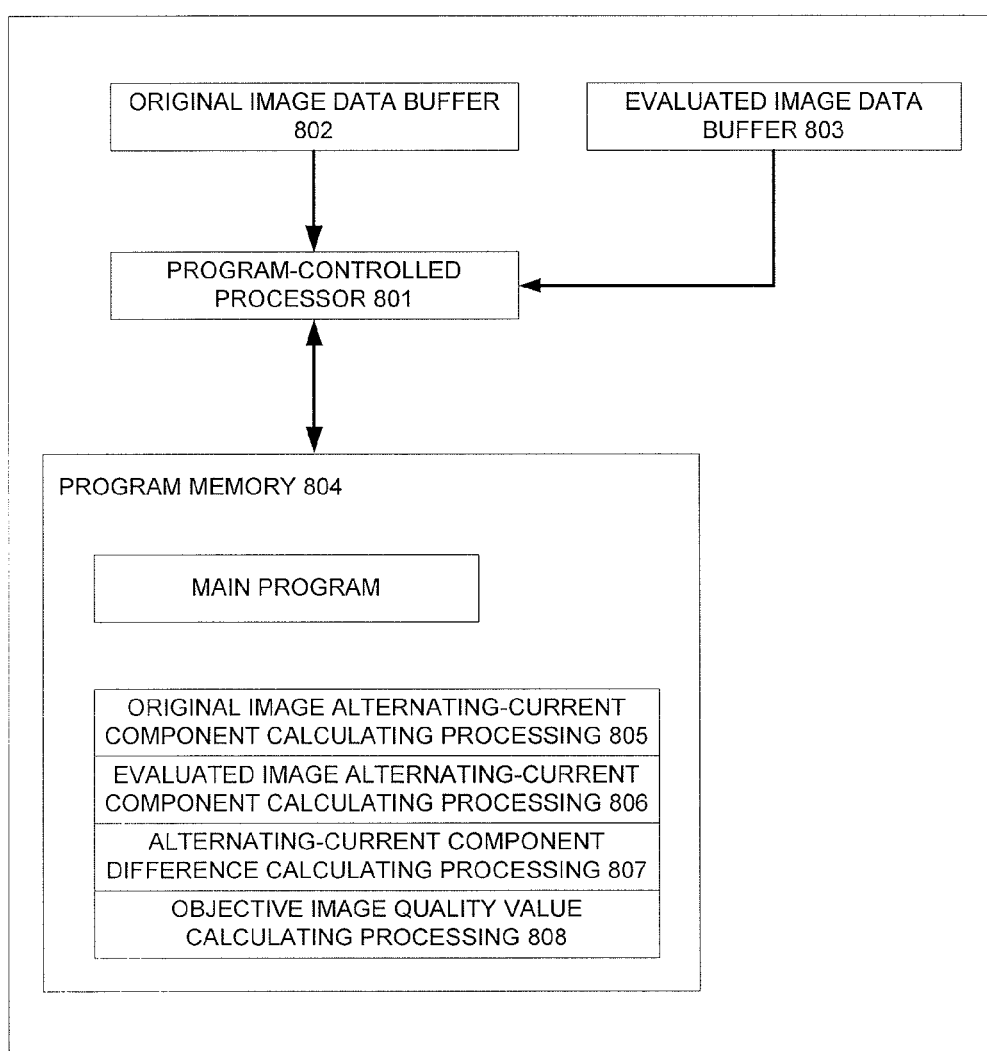
FIG. 12 is a block diagram of an image quality evaluation system in a seventh embodiment.

Referring to FIG. 12, the present system is provided with a program-controlled processor 801. The program-controlled processor 801 is connected with an original image data buffer 802 and an evaluated image data buffer 803, as well as a program memory 804 for storing therein required programs. Program modules stored in the program memory 804 comprise a main program, as well as those for original image alternating-current component calculating processing 805, evaluated image alternating-current component calculating processing 806, alternating-current component difference calculating processing 807, and objective image quality value calculating processing 808.

The main program is a principal program for executing the image quality evaluation processing. The program modules for the original image alternating-current component calculating processing 805, an evaluated image alternating-current component calculating processing 806, an alternating-current component difference calculating processing 807, and objective image quality value calculating processing 808 implement the functions of the original image alternating-current component calculating section 101, the evaluated image alternating-current component calculating section 102, the alternating-current component difference calculating section 103, and the objective image quality value calculating section 104, respectively.

While the above description addresses the image quality evaluation system in the first embodiment as an example, program modules that implement the functions of the second, third, fourth, fifth and sixth embodiments described earlier may also be realized in a computer system by implementing them in the computer system described above.

<Eighth Embodiment>

Next, an eighth embodiment of the present invention will be described in detail with reference to FIG. 13.

The eighth embodiment assumes a case in which an original image is located at a remote place.

Figure 13:
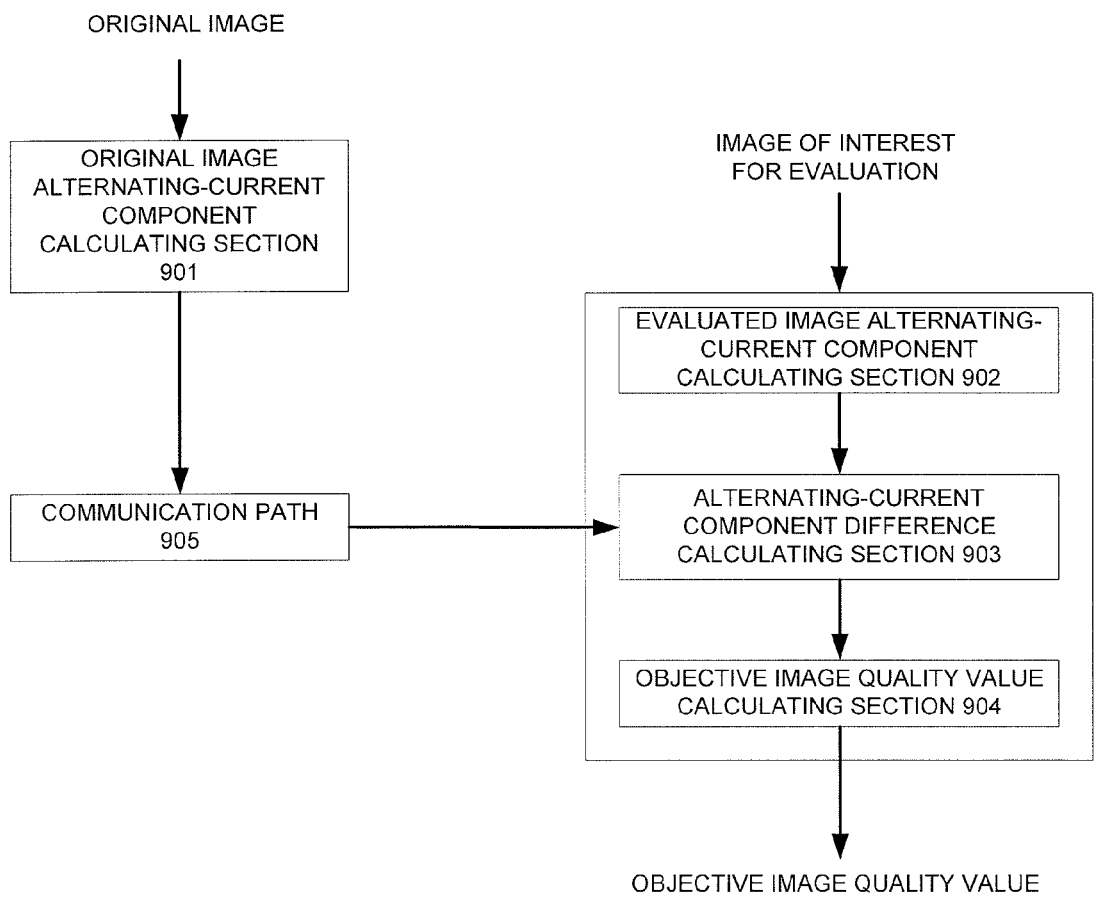
FIG. 13 is a block diagram of an image quality evaluation system in an eighth embodiment.

Referring to FIG. 13, a system for calculating an objective image quality value for an image of interest for evaluation is comprised of: an evaluated image alternating-current component calculating section 902 for calculating a statistical quantity of alternating-current components for each predetermined pixel group in the image of interest for evaluation; an alternating-current component difference calculating section 903 for calculating an alternating-current component differential value, which is a difference in statistical quantity of alternating-current components between the original image and image of interest for evaluation, for each predetermined pixel group; and an objective image quality value calculating section 904 for determining an objective image quality value from a result of calculation of the alternating-current component differential value.

The statistical quantity of alternating-current components for the original image is calculated at the original image alternating-current component calculating section 901 that is located externally to the system described above. The original image alternating-current component calculating section 901 and the system for calculating an objective image quality value for the image of interest for evaluation are connected to each other via a communication path 905.

By thus configuring the system to calculate a statistical quantity of alternating-current components (feature) of the original image in an external system, and acquire the statistical quantity of alternating-current components for the original image via a communication path, image quality evaluation is enabled when an original image is located in a remote place.

Moreover, the system may be configured to calculate both a statistical quantity of alternating-current components (feature) of the original image and that of the image of interest for evaluation in an external system, and acquire these statistical quantities of alternating-current components via a communication path. In this case, it is possible to achieve image quality evaluation even when both the original image and image of interest for evaluation are located in remote places.

While the above description addresses the image quality evaluation system in the first embodiment as an example, image quality evaluation in the second, third, fourth, fifth, sixth and seventh embodiments may also be realized in a similar configuration.

The 1st mode of the present invention is characterized in that an image quality evaluation method comprising, based on a statistical quantity of alternating-current components within a pixel group in a first image and that within a pixel group in a second image at the same position as that of said pixel group in said first image, evaluating image quality of said second image.

The 2nd mode of the present invention, in the above-mentioned mode, is characterized in that said statistical quantity of alternating-current components within a pixel group is an average of absolute differences within said image group, each of said differences being an absolute difference between an average of pixel values within said pixel group and each pixel value within said pixel group.

The 3rd mode of the present invention, in the above-mentioned modes, is characterized in that said statistical quantity of alternating-current components within a pixel group is a variance of pixel values within said pixel group.

The 4th mode of the present invention, in the above-mentioned modes, is characterized in that the image quality evaluation method comprises, based on an alternating-current component differential value, which is a difference between a statistical quantity of alternating-current components within a pixel group in said first image and that within a pixel group in said second image, calculating an objective image quality value for said second image.

The 5th mode of the present invention, in the above-mentioned modes, is characterized in that said alternating-current component differential value is an absolute difference between a statistical quantity of alternating-current components within a pixel group in said first image and that within a pixel group in said second image.

The 6th mode of the present invention, in the above-mentioned modes, is characterized in that said alternating-current component differential value is a squared difference between a statistical quantity of alternating-current components within a pixel group in said first image and that within a pixel group in said second image.

The 7th mode of the present invention, in the above-mentioned modes, is characterized in that the image quality evaluation method comprises applying weighting processing to said alternating-current component differential value based on at least high frequency components, block distortion or local degradation in said second image.

The 8th mode of the present invention, in the above-mentioned modes, is characterized in that the image quality evaluation method comprises applying weighting processing to said alternating-current component differential value based on the statistical quantity of alternating-current components for said second image.

The 9th mode of the present invention, in the above-mentioned modes, is characterized in that said weighting processing comprises comparing a statistical quantity of alternating-current components for said second image with a predetermined threshold, and in a case that the statistical quantity of alternating-current components for said second image is greater than said predetermined threshold, multiplying said alternating-current component differential value by a predetermined constant smaller than one.

The 10th mode of the present invention, in the above-mentioned modes, is characterized in that said weighting processing comprises comparing a statistical quantity of alternating-current components for said second image with a predetermined threshold, and in a case that the statistical quantity of alternating-current components for said second image is smaller than said predetermined threshold, multiplying said alternating-current component differential value by a predetermined constant greater than one.

The 11th mode of the present invention, in the above-mentioned modes, is characterized in that a multiplication factor for use in said weighting processing is derived from a predetermined function with an argument of a statistical quantity of alternating-current components for said second image.

The 12th mode of the present invention, in the above-mentioned modes, is characterized in that said weighting processing comprises determining an average of statistical quantities of alternating-current components for two horizontally adjacent pixel groups in said second image, determining a border difference average, which is an average of absolute differences in pixel value of pixels contiguous to said two pixel groups, and in a case that a ratio between said border difference average and said average of statistical quantities of alternating-current components is greater than a predetermined threshold, multiplying said alternating-current component differential value within said pixel group by a predetermined constant greater than one.

The 13th mode of the present invention, in the above-mentioned modes, is characterized in that said weighting processing comprises determining an average of statistical quantities of alternating-current components for two horizontally adjacent pixel groups in said second image, determining a border difference average, which is an average of absolute differences in pixel value of pixels contiguous to said two pixel groups, determining a ratio between said border difference average and said average of statistical quantities of alternating-current components, and in a case that a sum of said ratios over at least one or more predetermined frames is greater than a predetermined threshold, multiplying a sum of said alternating-current component differential values within said pixel group over said predetermined frames by a predetermined constant greater than one.

The 14th mode of the present invention, in the above-mentioned modes, is characterized in that said weighting processing comprises determining a variance of alternating-current components for every plurality of adjacent pixel groups comprised of a predetermined number of pixel groups for said first and second images, calculating a variance absolute difference between the variance of alternating-current components for said first image and that for said second image, and in a case that said variance absolute difference is greater than a predetermined threshold, multiplying said alternating-current component differential value calculated in said pixel group by a predetermined constant greater than one.

The 15th mode of the present invention, in the above-mentioned modes, is characterized in that said weighting processing comprises determining a variance of alternating-current components for every plurality of adjacent pixel groups comprised of a predetermined number of pixel groups for said first and second images, calculating a variance absolute difference between the variance of alternating-current components for said first image and that for said second image, and in a case that a sum of said variance absolute differences over at least one or more predetermined frames is greater than a predetermined threshold, multiplying a sum of alternating-current component differential values within said pixel group over said predetermined frames by a predetermined constant greater than one.

The 16th mode of the present invention, in the above-mentioned modes, is characterized in that said weighting processing comprises determining a variance of alternating-current components for every plurality of adjacent pixel groups comprised of a predetermined number of pixel groups for said first and second images, calculating a variance absolute difference between the variance of alternating-current components for said first image and that for said second image, determining an average of said variance absolute differences per frame for at least one or more predetermined frames, determining a ratio between a maximum and a minimum of said averages, and in a case that said ratio is greater than a predetermined threshold, multiplying a sum of said alternating-current component differential values over said predetermined frames by a predetermined constant greater than one.

The 17th mode of the present invention, in the above-mentioned modes, is characterized in that the image quality evaluation comprises applying weighting processing to said objective image quality value based on at least block distortion or local degradation in said second image.

The 17th mode of the present invention, in the above-mentioned modes, is characterized in that said weighting processing comprises determining an average of statistical quantities of alternating-current components for two horizontally adjacent pixel groups in said second image, determining a border difference average, which is an average of absolute differences in pixel value for pixels contiguous to said two pixel groups, determining a ratio between said border difference average and said average of statistical quantities of alternating-current components, and in a case that a sum of said ratios over at least one or more predetermined frames is greater than a predetermined threshold, multiplying said objective image quality value over said predetermined frames by a predetermined constant greater than one.

The 19th mode of the present invention, in the above-mentioned modes, is characterized in that said weighting processing comprises determining said variance of alternating-current components for every plurality of adjacent pixel groups comprised of a predetermined number of pixel groups for said first and second images, calculating a variance absolute difference between the variance of alternating-current components for said first image and that for said second image, and in a case that a sum of said variance absolute differences over at least one or more predetermined frames is greater than a predetermined threshold, multiplying said objective image quality value over said predetermined frames by a predetermined constant greater than one.

The 20th mode of the present invention, in the above-mentioned modes, is characterized in that said weighting processing comprises determining said variance of alternating-current components for every plurality of adjacent pixel groups comprised of a predetermined number of pixel groups for said first and second images, calculating a variance absolute difference between the variance of alternating-current components for said first image and that for said second image, determining an average of said variance absolute differences per frame over at least one or more predetermined frames, determining a ratio between a maximum and a minimum of said averages, and in a case that said ratio is greater than a predetermined threshold, multiplying said objective image quality value over said predetermined frames by a predetermined constant greater than one.

The 21st mode of the present invention is characterized in that an image quality evaluation method in which an original image is transmitted via a network, and the original image is received as an image of interest for evaluation, the method comprising: calculating an average of absolute differences within an image group in said original image, each of said differences being an absolute difference between an average of pixel values within a pixel group and each pixel value within said pixel group; calculating an average of absolute differences within an image group, each of said differences being an absolute difference between an average of pixel values within said pixel group in an image of interest for evaluation at the same position as that of said pixel group in said original image and each pixel value within said pixel group; transmitting at least the calculated average within said image group in said original image or that within said image group in said image of interest for evaluation to an image evaluation system for evaluating an image of interest for evaluation; and calculating an objective image quality value for the image of interest for evaluation at said image evaluation system based on a differential value between said average within said image group in said first image and said average within said image group in said second image.

The 22nd mode of the present invention is characterized in that an image quality evaluation system comprising: a first image alternating-current component calculating section for calculating a statistical quantity of alternating-current components within a pixel group in a first image; a second image alternating-current component calculating section for calculating a statistical quantity of alternating-current components within a pixel group in a second image; and an image quality evaluating section for evaluating image quality of said second image based on the statistical quantity of alternating-current components within a pixel group in said first image and that within a pixel group in said second image at the same position as that of said pixel group in said first image.

The 23rd mode of the present invention, in the above-mentioned modes, is characterized in that said first and second images alternating-current component calculating sections calculate an average of absolute differences within an image group, each of said differences being an absolute difference between an average of pixel values within said pixel group and each pixel value within said pixel group, as said statistical quantity of alternating-current components within a pixel group.

The 24th mode of the present invention, in the above-mentioned modes, is characterized in that said first and second images alternating-current component calculating sections calculate a variance of pixel values within said pixel group as said statistical quantity of alternating-current components within a pixel group.

The 25th mode of the present invention, in the above-mentioned modes, is characterized in that said image quality evaluating section comprises: an alternating-current component differential value calculating section for calculating an alternating-current component differential value, which is a difference between a statistical quantity of alternating-current components within a pixel group in said first image and that within a pixel group in said second image; and an objective image quality value calculating section for calculating an objective image quality value based on said alternating-current component differential value.

The 26th mode of the present invention, in the above-mentioned modes, is characterized in that said alternating-current component differential value calculating section calculates an absolute difference between a statistical quantity of alternating-current components within a pixel group in said first image and that within a pixel group in said second image as said alternating-current component differential value.

The 27th mode of the present invention, in the above-mentioned modes, is characterized in that said alternating-current component differential value calculating section calculates a squared difference between a statistical quantity of alternating-current components within a pixel group in said first image and that within a pixel group in said second image as said alternating-current component differential value.

The 28th mode of the present invention, in the above-mentioned modes, is characterized in that the image quality evaluation system comprises an alternating-current component differential value weighting section for applying weighting processing to said alternating-current component differential value based on at least high frequency components, block distortion or local degradation in said second image.

The 29th mode of the present invention, in the above-mentioned modes, is characterized in that said alternating-current component differential value weighting section applies weighting processing to said alternating-current component differential value based on the statistical quantity of alternating-current components for said second image.

The 30th mode of the present invention, in the above-mentioned modes, is characterized in that said alternating-current component differential value weighting section compares a statistical quantity of alternating-current components for said second image with a predetermined threshold, and in a case that the statistical quantity of alternating-current components for said second image is greater than said predetermined threshold, multiplies said alternating-current component differential value by a predetermined constant smaller than one.

The 31st mode of the present invention, in the above-mentioned modes, is characterized in that said alternating-current component differential value weighting section compares a statistical quantity of alternating-current components for said second image with a predetermined threshold, and in a case that the statistical quantity of alternating-current components for said second image is smaller than said predetermined threshold, multiplies said alternating-current component differential value by a predetermined constant greater than one.

The 32nd mode of the present invention, in the above-mentioned modes, is characterized in that a multiplication factor for use in said weighting processing is derived from a predetermined function with an argument of a statistical quantity of alternating-current components for said second image.

The 33rd mode of the present invention, in the above-mentioned modes, is characterized in that said alternating-current component differential value calculating section determines an average of statistical quantities of alternating-current components for two horizontally adjacent pixel groups in said second image, determines a border difference average, which is an average of absolute differences in pixel value of pixels contiguous to said two pixel groups, and in a case that a ratio between said border difference average and said average of statistical quantities of alternating-current components is greater than a predetermined threshold, multiplies said alternating-current component differential value by a predetermined constant greater than one.

The 34th mode of the present invention, in the above-mentioned modes, is characterized in that said alternating-current component differential value calculating section determines an average of statistical quantities of alternating-current components for two horizontally adjacent pixel groups in said second image, determines a border difference average, which is an average of absolute differences in pixel value of pixels contiguous to said two pixel groups, determines a ratio between said border difference average and said average of statistical quantities of alternating-current components, and in a case that a sum of said ratios over at least one or more predetermined frames is greater than a predetermined threshold, multiplies a sum of said alternating-current component differential values over said predetermined frames by a predetermined constant greater than one.

The 35th mode of the present invention, in the above-mentioned modes, is characterized in that said alternating-current component differential value calculating section determines a variance of alternating-current components for every plurality of adjacent pixel groups comprised of a predetermined number of pixel groups for said first and second images, calculates a variance absolute difference between the variance of alternating-current components for said first image and that for said second image, and in a case that said variance absolute difference is greater than a predetermined threshold, multiplies said alternating-current component differential value calculated in said pixel group by a predetermined constant greater than one.

The 36th mode of the present invention, in the above-mentioned modes, is characterized in that said alternating-current component differential value calculating section determines a variance of alternating-current components for every plurality of adjacent pixel groups comprised of a predetermined number of pixel groups for said first and second images, calculates a variance absolute difference between the variance of alternating-current components for said first image and that for said second image, and in a case that a sum of said variance absolute differences over at least one or more predetermined frames is greater than a predetermined threshold, multiplies a sum of said alternating-current component differential values over said predetermined frames by a predetermined constant greater than one.

The 37th mode of the present invention, in the above-mentioned modes, is characterized in that said alternating-current component differential value calculating section determines a variance of alternating-current components for every plurality of adjacent pixel groups comprised of a predetermined number of pixel groups for said first and second images, calculates a variance absolute difference between the variance of alternating-current components for said first image and that for said second image, determines an average of said variance absolute differences per frame over at least one or more predetermined frames, determining a ratio between a maximum and a minimum of said averages, and in a case that said ratio is greater than a predetermined threshold, multiplies a sum of said alternating-current component differential values over said predetermined frames by a predetermined constant greater than one.

The 38th mode of the present invention, in the above-mentioned modes, is characterized in that the image quality evaluation system comprises an objective image quality value weighting section for applying weighting processing to said objective image quality value based on at least block distortion or local degradation in said second image.

The 39th mode of the present invention, in the above-mentioned modes, is characterized in that said objective image quality value weighting section determines an average of statistical quantities of alternating-current components for two horizontally adjacent pixel groups in said second image, determining a border difference average, which is an average of absolute differences in pixel value of pixels contiguous to said two pixel groups, determines a ratio between said border difference average and said average of statistical quantities of alternating-current components, and in a case that a sum of said ratios over at least one or more predetermined frames is greater than a predetermined threshold, multiplies said objective image quality value over said predetermined frames by a predetermined constant greater than one.

The 40th mode of the present invention, in the above-mentioned modes, is characterized in that said objective image quality value weighting section determines a variance of alternating-current components for every plurality of adjacent pixel groups comprised of a predetermined number of pixel groups for said first and second images, calculates a variance absolute difference between the variance of alternating-current components for said first image and that for said second image, and in a case that a sum of said variance absolute differences over at least one or more predetermined frames is greater than a predetermined threshold, multiplies said objective image quality value over said predetermined frames by a predetermined constant greater than one.

The 41st mode of the present invention, in the above-mentioned modes, is characterized in that said objective image quality value weighting section determines a variance of alternating-current components for every plurality of adjacent pixel groups comprised of a predetermined number of pixel groups for said first and second images, calculates a variance absolute difference between the variance of alternating-current components for said first image and that for said second image, determining an average of said variance absolute differences per frame over at least one or more predetermined frames, determines a ratio between a maximum and a minimum of said averages, and in a case that said ratio is greater than a predetermined threshold, multiplies said objective image quality value over said predetermined frames by a predetermined constant greater than one.

The 42nd mode of the present invention is characterized in that an image quality evaluation system comprising: an original image alternating-current component calculating section for calculating an average of absolute differences within an image group in an original image, each of said differences being an absolute difference between an average of pixel values within a pixel group and each pixel value within said pixel group; an evaluated image alternating-current component calculating section for calculating an average of absolute differences within an image group in an image of interest for evaluation, each of said differences being an absolute difference between an average of pixel values within a pixel group and each pixel value within said pixel group; a differential value calculating section for acquiring at least an average within said image group calculated by said original image alternating-current component calculating section or that calculated by said evaluated image alternating-current component calculating section via a network, and calculating a differential value between the average within said image group in said original image and that within said image group in said image of interest for evaluation at the same position as that of said pixel group in said original image; and an objective image quality value calculating section for calculating an objective image quality value based on said differential value.

The 43rd mode of the present invention is characterized in that a program causing an information processing apparatus to execute: first image alternating-current component calculating processing of calculating a statistical quantity of alternating-current components within a pixel group in a first image; second image alternating-current component calculating processing of calculating a statistical quantity of alternating-current components within a pixel group in a second image; and image quality evaluation processing of evaluating image quality of said second image based on the statistical quantity of alternating-current components within a pixel group in said second image at the same position as that of said pixel group in said first image.

The 44th mode of the present invention, in the above-mentioned modes, is characterized in that said first and second images alternating-current component calculating processing comprises calculating an average of absolute differences within an image group, each of said differences being an absolute difference between an average of pixel values within a pixel group and each pixel value within said pixel group, as said statistical quantity of alternating-current components within a pixel group.

The 45th mode of the present invention, in the above-mentioned modes, is characterized in that said first and second images alternating-current component calculating processing comprises calculating a variance of pixel values within a pixel group as said statistical quantity of alternating-current components within a pixel group.

The 46th mode of the present invention, in the above-mentioned modes, is characterized in that said image quality evaluation processing comprises: alternating-current component differential value calculating processing of calculating an alternating-current component differential value, which is a difference between a statistical quantity of alternating-current components within a pixel group in said first image and that within a pixel group in said second image; and objective image quality value calculating processing of calculating an objective image quality value based on said alternating-current component differential value.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the sprit and scope of the invention.

This application is based upon and claims the benefit of priority from Japanese patent application No. 2008-118348, filed on Apr. 30, 2008, the disclosure of which is incorporated herein in its entirety by reference.

The invention claimed is:

1. An image quality evaluation method comprising, based on an alternating-current component differential value, which is a difference between a statistical quantity of alternating-current components within a pixel group in a first image and a statistical quantity of alternating-current components within a pixel group in a second image at the same position as a position of said pixel group in said first image, evaluating image quality of said second image,
    wherein said statistical quantity of alternating-current components within the pixel group is an average of absolute differences within an image group, each of said differences being an absolute difference between an average of pixel values within said pixel group and each pixel value within said pixel group,
    wherein the method comprises applying weighting processing to said alternating-current component differential value based on the statistical quantity of alternating-current components for said second image,
    wherein said weighting processing comprises comparing a statistical quantity of alternating-current components for said second image with a predetermined threshold, and in a case that the statistical quantity of alternating-current components for said second image is greater than said predetermined threshold, multiplying said alternating-current component differential value by a predetermined constant smaller than one.

2. An image quality evaluation method according to claim 1, wherein in a case that the statistical quantity of alternating-current components for said second image is smaller than said predetermined threshold, multiplying said alternating-current component differential value by a predetermined constant greater than one.

3. An image quality evaluation method according to claim 1, wherein said weighting processing comprises determining an average of statistical quantities of alternating-current components for two horizontally adjacent pixel groups in said second image, determining a border difference average, which is an average of absolute differences in pixel value of pixels contiguous to said two pixel groups, and in a case that a ratio between said border difference average and said average of statistical quantities of alternating-current components is greater than a predetermined threshold, multiplying said alternating-current component differential value within said pixel group by a predetermined constant greater than one.

4. An image quality evaluation method according to claim 1, wherein said weighting processing comprises determining an average of statistical quantities of alternating-current components for two horizontally adjacent pixel groups in said second image, determining a border difference average, which is an average of absolute differences in pixel value of pixels contiguous to said two pixel groups, determining a ratio between said border difference average and said average of statistical quantities of alternating-current components, and in a case that a sum of said ratios over at least one or more predetermined frames is greater than a predetermined threshold, multiplying a sum of said alternating-current component differential values within said pixel group over said predetermined frames by a predetermined constant greater than one.

5. An image quality evaluation method according to claim 1, wherein said weighting processing comprises determining a variance of alternating-current components for every plurality of adjacent pixel groups comprised of a predetermined number of pixel groups for said first and second images, calculating a variance absolute difference between a variance of alternating-current components for said first image and a variance of alternating-current components for said second image, and in a case that said variance absolute difference is greater than a predetermined threshold, multiplying said alternating-current component differential value calculated in said pixel group by a predetermined constant greater than one.

6. An image quality evaluation method according to claim 1, wherein said weighting processing comprises determining a variance of alternating-current components for every plurality of adjacent pixel groups comprised of a predetermined number of pixel groups for said first and second images, calculating a variance absolute difference between the variance of alternating-current components for said first image and the variance of alternating-current components for said second image, and in a case that a sum of said variance absolute differences over at least one or more predetermined frames is greater than a predetermined threshold, multiplying a sum of alternating-current component differential values within said pixel group over said predetermined frames by a predetermined constant greater than one.

7. An image quality evaluation method according to claim 1, wherein said weighting processing comprises determining a variance of alternating-current components for every plurality of adjacent pixel groups comprised of a predetermined number of pixel groups for said first and second images, calculating a variance absolute difference between the variance of alternating-current components for said first image and the variance of alternating-current components for said second image, determining an average of said variance absolute differences per frame for at least one or more predetermined frames, determining a ratio between a maximum and a minimum of said averages, and in a case that said ratio is greater than a predetermined threshold, multiplying a sum of said alternating-current component differential values over said predetermined frames by a predetermined constant greater than one.

8. An image quality evaluation method according to claim 1, wherein the method comprises applying weighting processing to an objective image quality value for said second image based on at least block distortion or local degradation in said second image,
wherein said weighting processing comprises determining an average of statistical quantities of alternating-current components for two horizontally adjacent pixel groups in said second image, determining a border difference average, which is an average of absolute differences in pixel value for pixels contiguous to said two pixel groups, determining a ratio between said border difference average and said average of statistical quantities of alternating-current components, and in a case that a sum of said ratios over at least one or more predetermined frames is greater than a predetermined threshold, multiplying said objective image quality value over said predetermined frames by a predetermined constant greater than one.

9. An image quality evaluation method according to claim 8, wherein said weighting processing comprises determining a variance of alternating-current components for every plurality of adjacent pixel groups comprised of a predetermined number of pixel groups for said first and second images, calculating a variance absolute difference between the variance of alternating-current components for said first image and the variance of alternating-current components for said second image, and in a case that a sum of said variance absolute differences over at least one or more predetermined frames is greater than a predetermined threshold, multiplying said objective image quality value over said predetermined frames by a predetermined constant greater than one.

10. An image quality evaluation method according to claim 8, wherein said weighting processing comprises determining a variance of alternating-current components for every plurality of adjacent pixel groups comprised of a predetermined number of pixel groups for said first and second images, calculating a variance absolute difference between the variance of alternating-current components for said first image and the variance of alternating-current components for said second image, determining an average of said variance absolute differences per frame over at least one or more predetermined frames, determining a ratio between a maximum and a minimum of said averages, and in a case that said ratio is greater than a predetermined threshold, multiplying said objective image quality value over said predetermined frames by a predetermined constant greater than one.

11. An image quality evaluation system comprising:
a first image alternating-current component calculator that calculates a statistical quantity of alternating-current components within a pixel group in a first image;
a second image alternating-current component calculator that calculates a statistical quantity of alternating-current components within a pixel group in a second image; and
an image quality evaluating section that evaluates image quality of said second image based on an alternating-current component differential value, which is a difference between said statistical quantity of alternating-current components within a pixel group in said first image and said statistical quantity of alternating-current components within a pixel group in said second image at the same position as a position of said pixel group in said first image,
wherein said first and second images alternating-current component calculators calculate an average of absolute differences within an image group, each of said differences being an absolute difference between an average of pixel values within the pixel group and each pixel value within said pixel group, as said statistical quantity of alternating-current components in the pixel group, wherein said image quality evaluating section comprises:

an alternating-current component differential value calculator that calculates an alternating-current component differential value, which is a difference between a statistical quantity of alternating-current components within a pixel group in said first image and a statistical quantity of alternating-current within a pixel group in said second image; and an objective image quality value calculator that calculates an objective image quality value based on said alternating-current component differential value, wherein the system comprises an alternating-current component differential value weighting section that applies weighting processing to said alternating-current component differential value based on at least high frequency components, block distortion or local degradation in said second image, wherein said alternating-current component differential value calculator determines an average of statistical quantities of alternating-current components for two horizontally adjacent pixel groups in said second image, determines a border difference average, which is an average of absolute differences in pixel value of pixels contiguous to said two pixel groups, and in a case that a ratio between said border difference average and said average of statistical quantities of alternating-current components is greater than a predetermined threshold, multiplies said alternating-current component differential value by a predetermined constant greater than one.

12. An image quality evaluation system according to claim 11, wherein said alternating-current component differential value calculator determines a ratio between said border difference average and said average of statistical quantities of alternating-current components, and in a case that a sum of said ratios over at least one or more predetermined frames is greater than a predetermined threshold, multiplies a sum of said alternating-current component differential values over said predetermined frames by a predetermined constant greater than one.

13. An image quality evaluation system according to claim 11, wherein said alternating-current component differential value calculator determines a variance of alternating-current components for every plurality of adjacent pixel groups comprised of a predetermined number of pixel groups for said first and second images, calculates a variance absolute difference between the variance of alternating-current components for said first image and the variance of alternating-current components for said second image, and in a case that said variance absolute difference is greater than a predetermined threshold, multiplies said alternating-current component differential value calculated in said pixel group by a predetermined constant greater than one.

14. An image quality evaluation system according to claim 11, wherein said alternating-current component differential value calculator determines a variance of alternating-current components for every plurality of adjacent pixel groups comprised of a predetermined number of pixel groups for said first and second images, calculates a variance absolute difference between the variance of alternating-current components for said first image and the variance of alternating-current components for said second image, and in a case that a sum of said variance absolute differences over at least one or more predetermined frames is greater than a predetermined threshold, multiplies a sum of said alternating-current component differential values over said predetermined frames by a predetermined constant greater than one.

15. An image quality evaluation system according to claim 11, wherein said alternating-current component differential value calculator determines a variance of alternating-current components for every plurality of adjacent pixel groups comprised of a predetermined number of pixel groups for said first and second images, calculates a variance absolute difference between the variance of alternating-current components for said first image and the variance of alternating-current components for said second image, determines an average of said variance absolute differences per frame over at least one or more predetermined frames, determining a ratio between a maximum and a minimum of said averages, and in a case that said ratio is greater than a predetermined threshold, multiplies a sum of said alternating-current component differential values over said predetermined frames by a predetermined constant greater than one.

16. An image quality evaluation system according to claim 11, wherein said alternating-current component differential value weighting section applies weighting processing to said alternating-current component differential value based on the statistical quantity of alternating-current components for said second image, wherein said alternating-current component differential value weighting section compares a statistical quantity of alternating-current components for said second image with a predetermined threshold, and in a case that the statistical quantity of alternating-current components for said second image is greater than said predetermined threshold, multiplies said alternating-current component differential value by a predetermined constant smaller than one.

17. An image quality evaluation system according to claim 11, wherein said alternating-current component differential value weighting section applies weighting processing to said alternating-current component differential value based on the statistical quantity of alternating-current components for said second image, wherein said alternating-current component differential value weighting section compares a statistical quantity of alternating-current components for said second image with a predetermined threshold, and in a case that the statistical quantity of alternating-current components for said second image is smaller than said predetermined threshold, multiplies said alternating-current component differential value by a predetermined constant greater than one.

18. An image quality evaluation system comprising:

a first image alternating-current component calculator that calculates a statistical quantity of alternating-current components within a pixel group in a first image;

a second image alternating-current component calculator that calculates a statistical quantity of alternating-current components within a pixel group in a second image; and an image quality evaluating section that evaluates image quality of said second image based on an alternating-current component differential value, which is a difference between said statistical quantity of alternating-current components within a pixel group in said first image and said statistical quantity of alternating-current components within a pixel group in said second image at the same position as a position of said pixel group in said first image, wherein said first and second images alternating-current component calculators calculate an average of absolute differences within an image group, each of said differences being an absolute difference between an average of pixel values within the pixel group and each pixel value within said pixel group, as said statistical quantity of alternating-current components in the pixel group, wherein said image quality evaluating section comprises:

an alternating-current component differential value calculator that calculates an alternating-current component differential value, which is a difference between a statistical quantity of alternating-current components within a pixel group in said first image and a statistical quantity of alternating-current within a pixel group in said second image; and an objective image quality value calculator that calculates an objective image quality value based on said alternating-current component differential value, wherein the system comprises an objective image quality value weighting section that applies weighting processing to said objective image quality value based on at least block distortion or local degradation in said second image, wherein said objective image quality value weighting section determines an average of statistical quantities of alternating-current components for two horizontally adjacent pixel groups in said second image, determining a border difference average, which is an average of absolute differences in pixel value of pixels contiguous to said two pixel groups, determines a ratio between said border difference average and said average of statistical quantities of alternating-current components, and in a case that a sum of said ratios over at least one or more predetermined frames is greater than a predetermined threshold, multiplies said objective image quality value over said predetermined frames by a predetermined constant greater than one.

19. An image quality evaluation system according to claim 18, wherein said objective image quality value weighting section determines a variance of alternating-current components for every plurality of adjacent pixel groups comprised of a predetermined number of pixel groups for said first and second images, calculates a variance absolute difference between the variance of alternating-current components for said first image and the variance of alternating-current components for said second image, and in a case that a sum of said variance absolute differences over at least one or more predetermined frames is greater than a predetermined threshold, multiplies said objective image quality value over said predetermined frames by a predetermined constant greater than one.

20. An image quality evaluation system according to claim 18, wherein said objective image quality value weighting section determines a variance of alternating-current components for every plurality of adjacent pixel groups comprised of a predetermined number of pixel groups for said first and second images, calculates a variance absolute difference between the variance of alternating-current components for said first image and that for said second image, determining an average of said variance absolute differences per frame over at least one or more predetermined frames, determines a ratio between a maximum and a minimum of said averages, and in a case that said ratio is greater than a predetermined threshold, multiplies said objective image quality value over said predetermined frames by a predetermined constant greater than one.

21. An image quality evaluation method comprising, based on a difference between a statistical quantity of a pixel group in a first image and a statistical quantity of a pixel group in a second image at the same position as a position of the pixel group in said first image, evaluating image quality of said second image, wherein said statistical quantity of the pixel group is an average of absolute differences within an image group, each of said differences being an absolute difference between an average of pixel values within said pixel group and each pixel value within said pixel group, wherein the method comprises applying weighting processing to said differential value based on the statistical quantity of said second image, wherein said weighting processing comprises determining an average of statistical quantities for two horizontally adjacent pixel groups in said second image, determining a ratio between an average of absolute differences in pixel value of pixels contiguous to said two pixel groups and an average of said statistical quantities, and in a case that an average of said ratios for predetermined frames is greater than a predetermined threshold, multiplying said image quality value for said predetermined frames by a predetermined constant smaller than one.

22. An image quality evaluation method according to claim 21, wherein said weighting processing comprises determining a variance of said statistical quantities for every plurality of adjacent pixel groups comprised of a predetermined number of pixel groups for said first and second images, calculating a variance absolute difference between the variance of statistical quantities for said first image and the variance of statistical quantities of statistical quantities for said second image, determining an average of said variance absolute differences per frame, and multiplying said objective image quality value for said predetermined frames by a predetermined constant smaller than one, based on a ratio between a maximum of said average and a minimum of said average.

* * * * *